(12) United States Patent
Jeftic-Stojanovski et al.

(10) Patent No.: US 7,992,421 B2
(45) Date of Patent: Aug. 9, 2011

(54) APPARATUS AND METHOD FOR MEASURING AND RECORDING DATA FROM VIOLENT EVENTS

(75) Inventors: Gordana Jeftic-Stojanovski, Kanata (CA); Lock-Sui Chin, Ottawa (CA); Jeffrey Levine, Nepean (CA); Jean-Philippe Dionne, Gatineau (CA); Doug Wong, Ottawa (CA); Aristidis Makris, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 0 days.

(21) Appl. No.: 12/746,225

(22) PCT Filed: Dec. 8, 2008

(86) PCT No.: PCT/CA2008/002125
§ 371 (c)(1),
(2), (4) Date: Aug. 20, 2010

(87) PCT Pub. No.: WO2009/070887
PCT Pub. Date: Jun. 11, 2009

(65) Prior Publication Data
US 2010/0307223 A1 Dec. 9, 2010

Related U.S. Application Data

(60) Provisional application No. 61/012,350, filed on Dec. 7, 2007.

(51) Int. Cl.
*G01M 7/00* (2006.01)

(52) U.S. Cl. ...................... 73/12.04; 73/12.01
(58) Field of Classification Search ....... 73/12.01–12.14
See application file for complete search history.

(56) References Cited

U.S. PATENT DOCUMENTS

| | | | |
|---|---|---|---|
| 5,471,405 A * | 11/1995 | Marsh | 702/41 |
| 5,978,972 A | 11/1999 | Steward et al. | |
| 6,871,525 B2 * | 3/2005 | Withnall et al. | 73/12.14 |
| 7,526,389 B2 * | 4/2009 | Greenwald et al. | 702/55 |
| 2003/0014210 A1 * | 1/2003 | Vock et al. | 702/149 |
| 2005/0177929 A1 | 8/2005 | Greenwald et al. | |
| 2005/0266967 A1 | 12/2005 | Considine et al. | |
| 2010/0326192 A1 * | 12/2010 | Petelenz et al. | 73/579 |

FOREIGN PATENT DOCUMENTS
WO 2004070336 8/2004

* cited by examiner

*Primary Examiner* — Max Noori
(74) *Attorney, Agent, or Firm* — McMillan LLP

(57) ABSTRACT

An apparatus is provided for recording information about an event resulting in application of a force to a body. The apparatus comprises data recording means for recording the information, sensor means for sensing a parameter which enables a predetermined source of force to be distinguished from another, different source of force, and control means responsive to the sensed parameter for controlling the data recording means. The sensor means may comprise a pressure sensor for sensing shockwaves resulting from an explosive force and the resulting signal used to distinguish from other events, such as blunt impacts. The pressure signal may be used to control the storage of acceleration data for injury analysis.

18 Claims, 29 Drawing Sheets

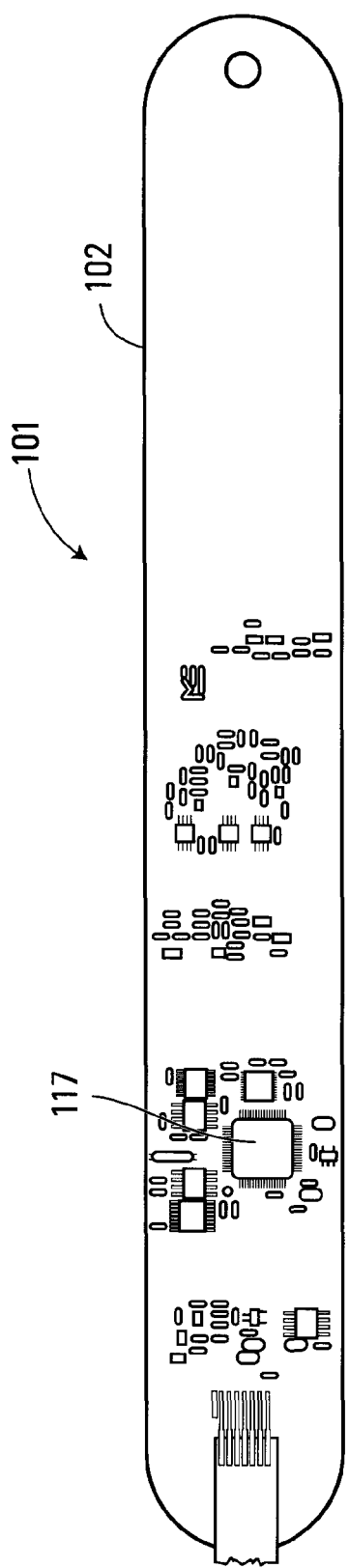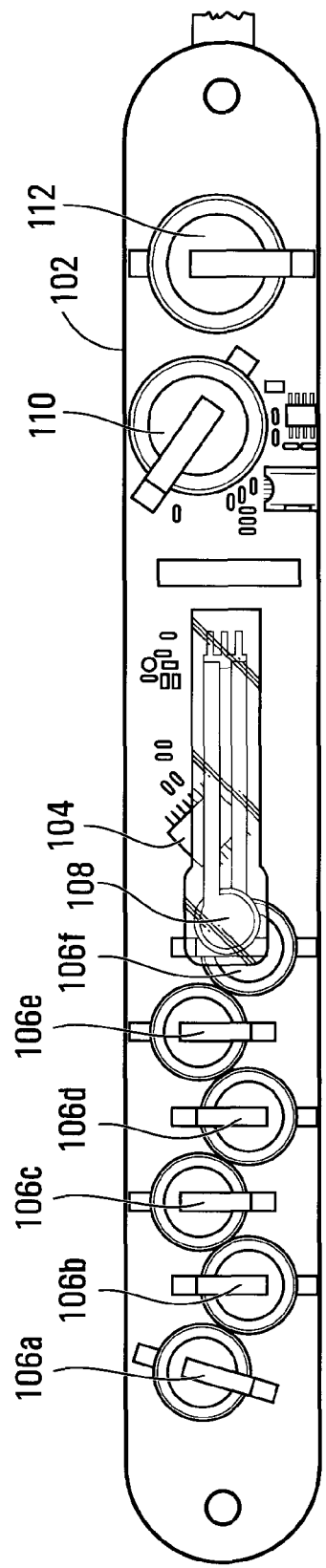
FIG. 3A
FIG. 3B

Theoretical overpressure and duration for all four charge masses plotted with respect Bass et al. [19] blast injury curves.

APPARATUS AND METHOD FOR MEASURING AND RECORDING DATA FROM VIOLENT EVENTS

FIELD OF THE INVENTION

The present invention relates to apparatus and methods for measuring and recording data from potentially injurious events to which humans may be exposed.

SUMMARY OF THE INVENTION

Embodiments of the present invention provide a data recorder adapted for mounting on a combat helmet to measure and record parameters indicative of head acceleration resulting from violent events such as violent impact and blast events. Despite current designs of head protection, exposure of a large number of soldiers to detonation of improvised explosive devices (IEDs) has resulted in a high occurrence of blast-induced traumatic brain injuries (TBI). TBI has been noted to lead to injuries ranging from headaches and mild concussions to severe casualties including severe concussions and memory loss. The data recorder enables data from violent events to be recorded and used to build a database of head acceleration data induced by violent events which may be correlated with injuries suffered. The data recorded from violent events may be used to correlate injuries, especially brain injuries, with event characteristics and severity, including accumulated dosage and long-term and chronic symptoms. The analyzed data may be used to determine optimal medical treatment based on instant analysis of event data and/or making longer term medical decisions. The data may be used to assess effectiveness of protective equipment, both in helmet technology and other applications.

Embodiments of the data recorder provide a small, lightweight, self-contained digital recording system, capable of recording acceleration waveforms experienced in violent events. Embodiments of the data recorder are designed to mount on helmets and monitor and record exposure to events that are potentially harmful to the head, and/or other part(s) of the body. Embodiments of the datalogger enable both the direction and magnitude of acceleration to be measured. In some embodiments, the data recorder includes three accelerometers that are each only sensitive to accelerations in a single direction (axis). The accelerometers are mounted orthogonally to measure the vector components of acceleration in three-dimensional space. Embodiments of the data recorder enable acceleration to be measured by all three accelerometers simultaneously, with the vector sum of their signals indicating both the direction of the acceleration and the magnitude of acceleration.

Embodiments of the data recorder include a power management system for reducing the amount of power consumed by the device to extend the time over which the device can remain operational in the field. In particular, the power management system provides a means of switching part(s) of the data recorder between active and inactive states so that power required by those parts to perform a particular function is only provided when the particular function is to be performed.

Embodiments of the data recorder include a memory management scheme for managing the recording of data and which is capable of deciding which data to save and which to discard in order to reduce the amount of memory space required, and also how to use the available memory space to store the data efficiently and reduce power.

According to one aspect of the present invention, there is provided an apparatus for recording information about an event resulting in application of a force to a body, comprising data recording means for recording said information, sensor means for sensing a parameter which enables a predetermined source of force to be distinguished from another, different source of force, and control means responsive to the sensed parameter for controlling said data recording means.

In some embodiments, at least one or more of the data recording means, the sensor means and the control means is adapted to be supported by the body. The body may comprise part of a human body, such as a head, or another object such as a head protector mounted on a person's head or any other article of apparel worn or supported by a person. The body may comprise the body of an anthropomorphic mannequin, which for example, may be used for testing or calibrating the apparatus.

In some embodiments, the apparatus is adapted to be mounted on a head protector. The head protector may be a military helmet or a helmet employed by other service personnel, for example, fire, ambulance, police, emergency or security personnel.

In some embodiments, the apparatus is adapted for mounting on the rear of a helmet, or in another position on the helmet which reduces exposure of the sensor means to rifle and mortar fire proximate the apparatus. This is particularly beneficial where the sensor means comprises a pressure sensor.

In some embodiments, the predetermined source is an explosive or means for generating explosive force.

In some embodiments, the sensor means comprises a pressure sensor. The pressure sensor may be adapted to discriminate between pressure and acceleration.

In some embodiments, the pressure sensor comprises a layer of material, at least one property of which changes with pressure. The layer may, for example, have a major area transverse to its thickness and which is exposed to atmospheric pressure or pressure external of the apparatus. The property may be an electrical property, for example, any one or more of electrical resistance, capacitance, inductance, impedance or reactance. The material may comprise, for example, a semiconductor material.

In some embodiments, the pressure sensor comprises first and second elements, in which the first element is adapted to measure acceleration and pressure, and the second element is adapted to measure acceleration only. This may be achieved by effectively isolating the second element from pressures to which the first element is exposed. The sensors may be arranged so that the acceleration measured by one sensor tends to cancel out the acceleration measured by the other sensor. Alternatively, or in addition, acceleration compensation circuitry may be provided to remove the acceleration component to provide a measurement of pressure only.

In some embodiments, the sensor has an active area exposed to a medium whose pressure is to be sensed (e.g. atmosphere) and a support may be provided for supporting the sensor over substantially the entire active area, for example, at substantially all positions within the active area.

In some embodiments, the support provides a substantially planar surface against which the pressure sensor is positioned.

In some embodiments, the apparatus further comprises a substrate for mounting components of the apparatus, and wherein the support for the pressure sensor is mounted on a substrate and supports the pressure sensor at a raised position above the substrate.

In some embodiments, the control means is adapted to control the recording of data such that recorded data resulting from said predetermined source can be distinguished from recorded data resulting from another source of force.

In some embodiments, the data recording means comprises a memory space reserved only for recording data from the predetermined source, and the data recording means is responsive to the controller to record any data from the predetermined source in said reserved memory space. Advantageously, this provides a means of distinguishing data recorded from an explosive source, for example, with data resulting from a blunt impact or other source of force.

In some embodiments, the data recording means is adapted to be capable of recording data resulting from the predetermined source of force in the same memory space as other data resulting from another, different source of force has previously been recorded, thereby overwriting the other data. This may be enabled if a predetermined criteria is met, for example, that there is insufficient space for recording data resulting from the predetermined source of force.

In some embodiments, control means may be provided to switch the data recording means between an active state and an inactive state based on the sensed parameter. For example, if the sensed parameter is pressure, the control means may be adapted to determine if the pressure meets a predetermined criteria, for example, is at or exceeds a predetermined threshold value, and if so, enables the data recording means to record information about the event. In some embodiments, in the inactive state, the data recording means is unable to record data, and in the active state, the data recording means is able to record data. In some embodiments, in the active state, the data recording means draws more electrical power than when in the inactive state. Thus, this arrangement allows power to be conserved when a predetermined criteria required to record data is not met. In some embodiments, the pressure threshold for activating the data recording unit or a function thereof may be any pressure which enables an explosive force to be discriminated from another force. The threshold may, for example, be 0.5 bar or any pressure between 0.5 bar and 1 bar or more than 1 bar.

In some embodiments, a generator is provided for generating timing signals for the data recording means, and means are provided to control the provision of timing signals to the data recording means. Advantageously, this provides a means of rapidly starting the data recording means. The control means for controlling the provision of timing signals to the data recording means may be responsive to whether or not a predetermined criteria is met to enable the provision of timing signals to the data recording means. Such predetermined criteria may be based on a sensed acceleration, a sensed pressure or another parameter.

In some embodiments, the data recording means is adapted to cease the provision of timing signals from said generator after a predetermined time has elapsed, for example, from when the provision of timing signals started.

In some embodiments, storage means is provided for storing data measured by the sensor means. The storage means may be capable of storing the data irrespective of whether the data recording means is in the active or inactive state.

In some embodiments, means may be provided for detecting a characteristic of the sensed parameter, for example, a peak value of the parameter, or whether or not the parameter reaches or exceeds a predetermined value.

In some embodiments, the information comprises acceleration experienced by the body or object to which the apparatus is mounted, resulting from the force.

Some embodiments may comprise sensor means for sensing acceleration experienced by the body resulting from the force. The acceleration sensor may be adapted to sense acceleration in at least two orthogonal directions or three orthogonal directions, for example.

The acceleration sensor may be adapted to sense acceleration from an explosive force, and may for example, be capable of measuring forces of 1,500 gs or more, 5,000 gs or more, 10,000 gs or more or 15,000 gs or more.

In some embodiments, the data recording means is capable of recording acceleration waveforms having frequencies in the range of at least 500 to 1,000 Hz, or more.

In some embodiments, the data recording means is capable of changing from an inactive state to an active state in less than 1 millisecond, for example, less than 500 microseconds or less than 400, 300 or 200 microseconds, or in about 100 microseconds or less.

In some embodiments, the apparatus further comprises monitoring means for monitoring a power source for providing power to the apparatus.

In some embodiments, the data recording means is capable of recording data from a plurality of events that occur within 1 second.

According to another aspect of the present invention, there is provided an apparatus adapted for mounting on a head protector and comprising sensor means for sensing the presence of a head in the head protector.

In one embodiment, the apparatus may be mounted to and/or incorporated in a head protector.

The sensor means may be adapted to sense the dielectric of a head. The sensor may comprise a capacitive sensor. The sensor may include first and second spaced apart electrode elements. The electrode elements may comprise a fastener for fastening an object to the head protector. A shield for electrically shielding at least one electrode element from capacitive effects of objects external of the head protector may be provided. The apparatus may further comprise means for providing an electrical signal to the shield, or the shield may be grounded, for example.

According to another aspect of the present invention, there is provided an apparatus for recording data, comprising a substrate, one or more components mounted on said substrate, and additional means for resisting relative movement between said substrate and said one or more components and/or for resisting relative movement between two or more components.

In some embodiments, the resistance means comprises a formable material, for example, a material which is applied to the components/substrate in fluid form and sets or cures to a more rigid state. The components may be at least partially or completely embedded in the material.

In some embodiments, the apparatus may further comprise a coating or layer of material between the resistance means and at least a portion of the substrate and/or at least a portion of one or more components. The coating may be more flexible than the resistance means.

In some embodiments, the apparatus further comprises a bracket or other mounting means for mounting the apparatus to a helmet. Mounting means may include one or more aperture or slots for receiving fastening means for fastening the apparatus to a helmet.

In some embodiments, the bracket or mounting means is at least partially flexible to accommodate helmets with different degrees of curvature.

In some embodiments, the apparatus further comprises a housing for accommodating one or more components of the apparatus, wherein at least a portion of the bracket or mounting means extends beyond an edge of the housing and has a higher degree of flexibility in a region external of the edge of the housing than within the peripheral or exterior edge of the housing.

In some embodiments, at least a portion of the apparatus has a face for placing against the exterior surface of the shell of the head protector and at least partially conforms to the shape of the shell.

According to another aspect of the present invention, there is provided an apparatus for mounting to a head protector comprising a housing comprising a plurality of parts each defining a portion of said housing, one or more components to be accommodated in said housing, and one or more apertures in said housing for introducing a compound for securing said one or more components in said housing.

In some embodiments, the housing has a front and a back, and the component or components are mounted between the front and the back with a space between the component and at least one of the front and the back for receiving the compound.

According to another aspect of the present invention, there is provided a method of making a data recording apparatus comprising providing a housing comprising a plurality of parts, securing one or more components within said housing, closing said housing and introducing into said housing a material for at least partially surrounding one or more components within the housing.

In some embodiments, one of the components comprises a pressure sensor, and further comprising the steps of mounting the pressure sensor opposite an aperture in the housing and abutting the pressure sensor against means defining said aperture.

Other aspects and embodiments of the invention comprise any one or more further steps or features claimed or disclosed herein.

Other aspects and embodiments of the apparatus comprise any combination of any two or more features disclosed or claimed herein.

According to another aspect or embodiment, there is provided an apparatus for measuring acceleration of a person's head or other object, comprising sensing means for sensing acceleration, and a controller for controlling recording of data resulting from the sensed acceleration, wherein the controller is adapted to determine, based on the sensed acceleration, whether or not to enable recording of the data.

In some embodiments, the controller is adapted to enable recording of the data if the sensed acceleration meets a predetermined criteria, for example, if the measured acceleration reaches or exceeds a predetermined value. The predetermined or threshold value may be a finite value below a value that would or is likely to cause a predetermined injury to a person.

In some embodiments, the apparatus comprises data receiving means for receiving sensed acceleration data from the sensing means, the receiving means requiring electrical power to enable the data to be received thereby, and wherein the controller causes electrical power to the receiving means to be controlled based on the sensed acceleration.

In some embodiments, the controller is adapted to determine whether or not the sensed acceleration meets a predetermined criteria, and if the criteria is not met, the controller causes the electrical power to be controlled such that the receiving means is unable to receive the data. On the other hand, if the criteria is met, the controller is adapted to cause the electrical power to be controlled to enable the receiving means to receive the data.

Advantageously, the predetermined threshold value may be selected to provide sufficient time for the receiving means to change from an inactive state to an active state to receive acceleration data indicative of an injury.

In some embodiments, the receiving means comprises any one or more of signal conditioning means for conditioning the signal, an analog-to-digital converter, a processor and a memory. The memory may comprise a volatile memory such as a random access memory.

Embodiments of the apparatus may further comprise a second memory operatively coupled to the first memory for receiving data therefrom. The second memory may comprise a non-volatile memory or another memory requiring no power or less power than the first memory to hold data.

In some embodiments, the apparatus further comprises determining means for determining whether or not to transfer data from the first memory to the second memory. The determination may be based on the acceleration data. The determining means may be adapted to cause the data to be transferred from the first memory to the second memory, if the acceleration data meets a predetermined criteria. The predetermined criteria may be, for example, that a value of acceleration in the acceleration data (which may or may not be the peak acceleration) is likely to be sufficient to cause injury or has been previously determined to cause injury. At least one of the first and second memories may be an internal memory of a processor.

In some embodiments, the apparatus further comprises a third memory operatively coupled to the second memory for receiving data therefrom. A memory controller may be provided for controlling the transfer of data from the second memory to the third memory. The memory controller may be conditioned to transfer acceleration data from the second and third memory only if the second memory contains acceleration data from a plurality of separate events.

In some embodiments, the memory controller is adapted to transfer acceleration data relating to a plurality of different events from the second to the third memory in a single or the same write operation. Advantageously, this transfer scheme assists in reducing power since write operations can be power intensive. For example, the memory controller may be adapted to transfer acceleration data relating to three or more events in a single operation, for example, 5, 10, 15 or 20 or any other number.

In some embodiments, the apparatus further comprises monitoring means for monitoring the time of an acceleration event and means for recording acceleration data of an event and the time of the event. Advantageously, this arrangement allows acceleration data to be time stamped so that it can be correlated with other information that may be recorded about the event and which may assist in the compilation and analysis of injury data.

In some embodiments, the apparatus further includes a temperature sensor for sensing the temperature of one or more components of the apparatus. As components of the data recorder, for example, the sensors, may be temperature dependent, measuring the temperature may assist in performing temperature compensation and increasing the accuracy of the measurements, where needed.

The data recorder may be adapted to be mounted to a helmet, for example, to the helmet shell, for example on the outside of the shell. The data recorder may be adapted for releasably fastening to the helmet so that it can be readily removed therefrom and replaced, as necessary.

According to another aspect or embodiment, there is provided an apparatus for measuring a parameter resulting from exposure of a person to a physical event, comprising sensor means for sensing said parameter, determining means for determining a relationship between the value of the sensed parameter and a predetermined value of said parameter, and a controller responsive to the determining means for controlling a device in response to the determination made by the determining means.

According to another aspect or embodiment, there is provided an apparatus for measuring acceleration of a person's head resulting from exposure of the head to a force, the apparatus comprising sensing means for sensing said acceleration, determining means for determining a relationship between the value of the sensed acceleration and a predetermined value of acceleration, and a controller responsive to said determining means for controlling a device in response to the determination made by the determining means.

In some embodiments, the sensing means comprises an accelerometer for measuring acceleration in three mutually orthogonal directions.

In some embodiments, the relationship determined by said determining means is whether or not the sensed value of acceleration is equal to or exceeds the predetermined value.

In some embodiments, the predetermined value is below a value determined to cause a predetermined degree of injury.

In some embodiments, the device comprises a power controller, a memory, a processor, an indicator or another device.

In some embodiments, the device comprises a recording means for recording the value of the sensed parameter.

In some embodiments, the apparatus includes mounting means for mounting the apparatus to a protective helmet.

Advantageously, the apparatus allows head acceleration to be measured only when it is determined that the sensed acceleration is sufficient to actually warrant recording the measurement thereby reducing the electrical power requirements and extending the useful life of the system when powered by a battery.

According to another aspect or embodiment, there is provided an apparatus for recording data indicative of acceleration of a part of a person's body, comprising first memory means for assuming acceleration data from an acceleration sensor, second memory means operatively coupled to the first memory means for receiving data from the first memory means, and a data transfer controller for controlling the transfer of data from the first memory means to the second memory means based on the acceleration data.

According to another aspect or embodiment, there is provided a method of monitoring acceleration of a part of a body of military or service personnel comprising the steps of mounting a monitor for monitoring acceleration to the body part to be monitored.

Embodiments of the method may include any one or more additional features disclosed herein.

Embodiments of the invention may comprise any one or more of the following optional features:

The memory controller is adapted to transfer acceleration data relating to between 3 and 20 events or more in a single operation.

Recording means may be provided for recording acceleration data relating to an acceleration event and for recording the temperature at the time of the event.

The sensing means for sensing acceleration may comprise a plurality of sensors each capable of measuring acceleration in a single direction and configured to measure acceleration in a direction which is mutually perpendicular to the direction of one or more other acceleration sensors.

The control means may comprise a comparator for comparing the sensed acceleration with a predetermined value.

The control means may comprise a plurality of comparators each for comparing acceleration sensed by a respective acceleration sensor with a predetermined value.

The apparatus may be adapted to be secured to a person's head.

The apparatus may be adapted to be carried on a helmet to be secured to a person's head.

A mounting means may be provided for mounting the apparatus to the helmet.

The mounting means may be adapted to releasably fasten the apparatus to the helmet.

The helmet may comprise a military or combat helmet.

The apparatus may include an electrical power source for providing electrical power to the apparatus.

The electrical power source may comprise one or more battery cells.

At least one battery cell may be non-rechargeable.

One or more components of the apparatus may be mounted on a common substrate and one or more components are subsequently embedded in a pourable substance.

A protective cover or cap may be provided for covering said board or substrate.

The first memory means may require electrical power to hold data therein.

The second memory means may be capable of holding data therein in the absence of electrical power or with less power than required by said first memory means.

The controller may be adapted to enable the transfer of data from said first memory means to said second memory means in response to and/or only in the event of said acceleration data meeting a predetermined criteria.

The memory controller may be conditioned to transfer acceleration data from said second memory to said third memory only if said second memory contains acceleration data from a plurality of separate events.

The third memory may be adapted to hold data in the absence of electrical power or with less electrical power than required by at least one of said first and second memory means.

A monitoring means may be provided for monitoring the time of an acceleration event and means for recording the time of the event in a manner in which the time of the event is associated with acceleration data of the event.

The sensor and said first and second memory means may be mounted on a common substrate.

The first and second memories and said controller may be mounted on a common substrate.

The first and second memories and said controller may be contained in a unit adapted to be part of a helmet assembly.

The apparatus may include control means for controlling operation of said receiving means, a generator for generating timing signals for operation of said control means, and wherein said controller is operatively coupled to said generator to control said generator.

The control means may comprise a processor.

The generator may comprise a clock signal generator.

The generator may be adapted to switch from an inactive state to an active state in response to said controller determining to enable recording of the data based on the sensed acceleration.

The generator may be adapted to switch from an inactive state to an active state in response to a predetermined control signal from said controller.

The control signal may provide electrical power for driving said generator.

The control means may be adapted to control said generator.

The control means may be adapted for switching said generator from an active state to an inactive state.

The control means may be adapted to switch said generator from an active state to an inactive state after said generator has been in the active state for a predetermined period of time.

The apparatus may include a means for controlling said generator to change from an active state to an inactive state. The means may be adapted to change said generator from an active state to an inactive state after a predetermined period of time.

The apparatus may include a control means for controlling operation of said receiving means, a generator for generating timing signals for operation of said control means and wherein said controller is adapted to control receipt by said control means of said timing signals.

The apparatus may include a second means for controlling receipt by said control means of timing signals from said generator.

Other aspects and embodiments may provide a method of calibrating a data recording unit for measuring head acceleration, comprising the steps of:
(a) providing a data recording unit mounted to a head protector;
(b) mounting the head protector on a support;
(c) subjecting the head protector a force or pressure;
(d) measuring acceleration of the head protector resulting from the force or pressure;
(e) measuring acceleration of the support resulting from the force or pressure; and
(f) determining a relationship between the measured acceleration of the head protector and of the support.

In some embodiments, the method includes subjecting the head protector and support or another head protector and/or support to a plurality of different forces or pressures and repeating at least steps (d) and (e) for each different force.

In some embodiments, the force or pressure is applied in substantially the same direction relative to the head protector and support.

Some embodiments further include subjecting the head protector and support and/or another head protector and/or support to a plurality of successive forces or pressures each applied to the head protector and support in a different direction, and repeating at least steps (d) and (e) for each different direction.

In some embodiments, a plurality of forces or pressures in different directions have substantially the same strength.

Some embodiments further include using the relationship to determine head acceleration from data recorded by a data recording unit mounted to a head protector.

In some embodiments, the data recording unit comprises a data recording unit other than the data recording unit used to determine said relationship, for example, a data recording unit used in actual service.

Some aspects and embodiments provide a method of determining the value of a parameter indicative of acceleration of a person's head or other object, comprising the steps of: acquiring data measured by an acceleration sensor mounted to a head protector and using a calibration method to determine from the data the value of said parameter.

In some embodiments, the calibration method is derived from data describing a relationship between head acceleration and head protector acceleration.

Some embodiments may include determining the direction of acceleration from the acquired data and selecting the calibration method based on the direction.

Some embodiments may include monitoring acceleration of a part of a body of a military or other service personnel.

In some embodiments, the sensor means is adapted to sense accelerations having values resulting from a blast or explosive force.

Some aspects and embodiments provide a method of monitoring acceleration of a part of a body of military or service personnel comprising mounting a monitor for monitoring acceleration to the body part to be monitored.

Some embodiments further comprise, by means of a controller, controlling activation of data recording means from an inactive state to an active state based on the monitored acceleration.

Some embodiments further include determining whether or not to transfer acceleration data resulting from said monitoring from a first memory means to a second memory means based on the monitored acceleration.

In some embodiments, the monitor is capable of measuring acceleration of the body part resulting from an explosion.

BRIEF DESCRIPTION OF THE DRAWINGS

Examples of embodiments of the present invention will now be described with reference to the drawings, in which:

FIGS. 3A and 3B show a plan view of first and second sides of a circuit card on which components of the data recording unit are mounted;

DETAILED DESCRIPTION

Figure 1:
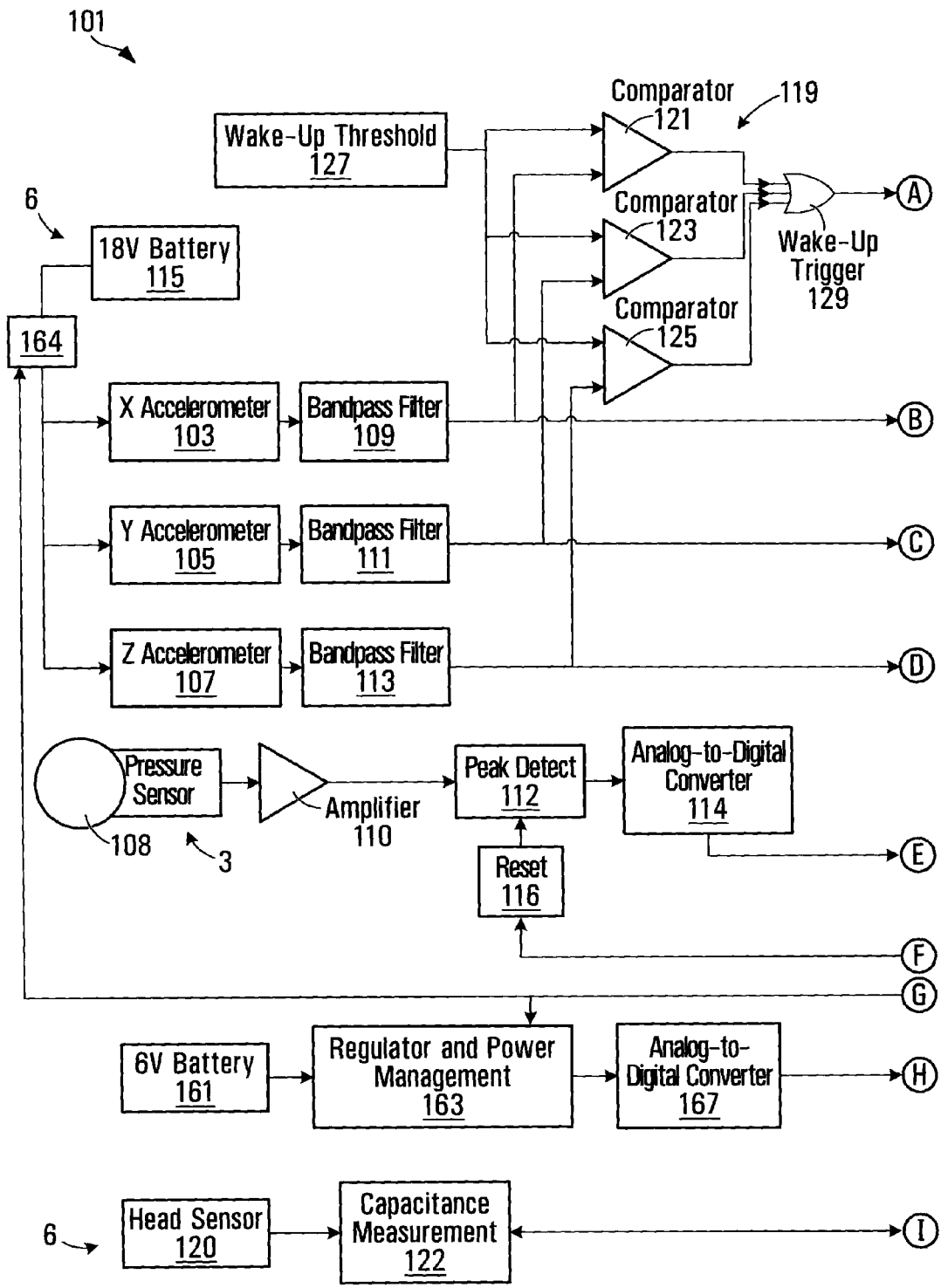
FIG. 1 shows a block diagram of a data recording unit according to an embodiment of the present invention.
Figure 1:
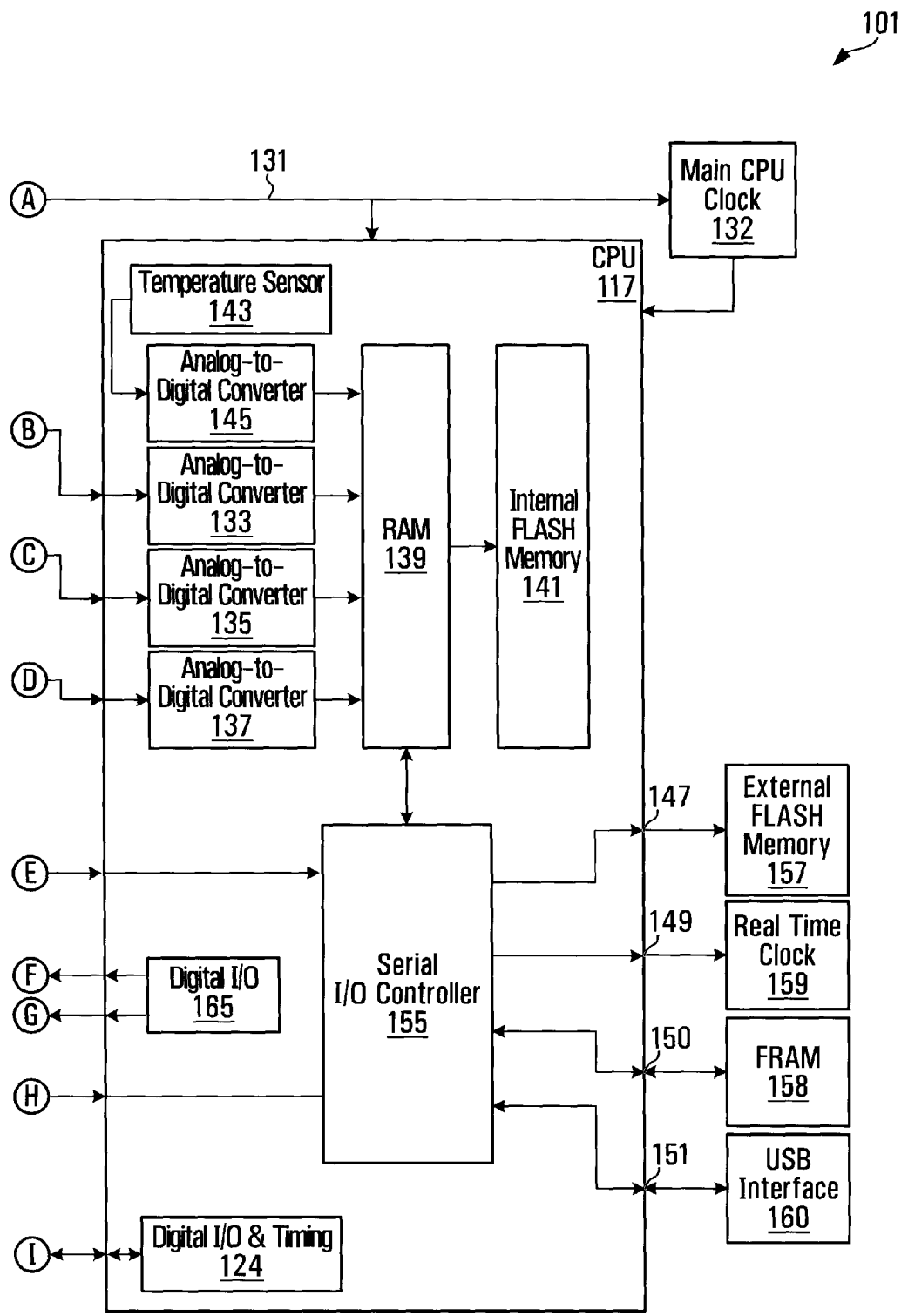

A block diagram of an example of a data recording unit is shown in FIG. 1. Referring to FIG. 1, the data recording unit 101 includes first, second and third accelerometers 103, 105, 107, each of which measures acceleration in a single direction which is orthogonal to the acceleration direction measured by the other two accelerometers. The accelerometers may be arranged so that they each lie on a respective one of three mutually orthogonal axes in which all of the axes meet at a common point, to assist in resolving the actual direction of acceleration from the acceleration trace produced by each accelerometer. In this embodiment, the first accelerometer 103 measures acceleration in the front-back (designated x) direction, the second accelerometer 105 measures acceleration in the left-right (designated y) direction, and the third accelerometer 107 measures acceleration in the up-down (designated z) direction. In some embodiments, the accelerometers use transducers that produce or generate an electrical signal in response to sensing acceleration, without the transducers requiring electrical power to do so, in order to help reduce power requirements. In some embodiments, the accelerometers use transducers that exploit the Piezo-electric effect to generate a charge proportional to acceleration.

A respective band pass filter 109, 111, 113 may be provided for filtering the signal from each accelerometer 103, 105, 107. A respective amplifier (not shown) may be provided to amplify each accelerometer signal, either before or after the band pass filter, or both. In some embodiments, the amplifiers may be very low power op-amps to help minimize the amount of power required by the sensor circuitry. Electrical power for the sensor circuitry is provided by a suitable power source 115, which may comprise one or more individual battery cells.

The data recording unit includes a pressure sensor 108 and associated circuitry for enabling blast events to be distinguished from violent impact events. The pressure sensor circuitry includes an amplifier 110 coupled to the pressure sensor for amplifying the signal therefrom, a peak detector 112 for detecting peak pressure from the amplified signal and an analog-to-digital converter 114. A reset means or circuit 116 may also be provided for resetting the peak detection circuit 112. The peak detector circuit may be configured to capture the peak pressure, no matter when it occurs. The peak detector may be arranged to hold the peak pressure until the data processing unit has read the pressure or has had the opportunity to do so. The reset means, e.g. circuit 116, may be adapted to reset the peak-detect circuit ready to capture another peak and this task may be initiated or performed, for example, by the data processing unit. In some embodiments, the peak detect circuit may be configured to decay naturally as an alternative or addition to the reset function. In other embodiments, the peak detect circuit may be replaced by or supplemented by a circuit which simply compares a measured pressure with a predetermined value and produces an output depending on whether the peak pressure reaches and/or exceeds the predetermined value.

A head sensor 120 may optionally be provided for detecting whether or not the data recording unit is being worn by a person. In some embodiments, the head sensor may be provided on a helmet or head protector to which the data recording unit is mounted. In some embodiments, the head sensor may comprise a capacitance based sensor which is responsive to increased capacitance due to the presence of a person's head in the helmet. In this embodiment, a capacitance measurement circuit 122 is provided for measuring capacitance and providing an output signal indicative thereof. In other embodiments, any other suitable sensor may be used to determine whether or not the data recording unit is being worn by a person.

The data recording unit includes a data processing unit 117 for receiving acceleration signals from the accelerometers 103, 105, 107, and a control or discriminating circuit 119 for controlling the state of the data processing unit 117 to manage the power drawn by the unit. In particular, the control circuit 119 is arranged to control the data processing unit 117 between a first, inactive state in which the data processing unit is in "sleep" mode and draws no or little power and is unable to record acceleration data, and a second state in which the data processing unit is in "an awake" mode or active state and able to record acceleration data. In this embodiment, the control circuit 119 comprises a respective comparator 121, 123, 125 coupled to receive acceleration signals from a respective accelerometer and for comparing the magnitude of the acceleration signals with a predetermined value. In this particular embodiment, one input of each comparator is coupled to receive a respective accelerometer signal from a respective band pass filter and another input of each comparator is coupled to receive the threshold value provided by a suitable source 127. The output of each comparator is coupled to a suitable logic device or circuit, for example, an OR gate 129 which is arranged to output a trigger signal 131 to the data processor unit 117 to cause the data processing unit to change from an asleep state to an awake state if the acceleration measured by any one of the accelerometers reaches or exceeds the predetermined threshold value.

A main clock 132 provides clocking signals to the data processing unit, and, in this embodiment, is an external clock, although in other embodiments, the clock may be internal of the CPU. The trigger signal 131 is provided to the main clock 132 to control operation thereof, as described in more detail below.

Some embodiments may be adapted to base the determination as to whether or not to enable the data recording unit to receive and record acceleration data on any other characteristic of the sensed acceleration. These may include any one or more of a time derivative of acceleration, such as the slope of an impulse, or Fourier frequency component(s) in the waveforms. A derivative circuit may be provided to monitor the slopes of impulses or appropriate circuitry may be provided to perform a Fourier analysis on the waveform, and to determine whether the resulting values meet a predetermined criteria. This may allow even earlier detection of significant events.

The data processing unit 117 includes first, second and third analog-to-digital converters 133, 135, 137 for receiving acceleration signals from a respective accelerometer 103, 105, 107, a first memory unit 139 for recording digital acceleration data from each A to D converter 133, 135, 137, and a second memory unit 141 for receiving data from the first memory unit 139. The first memory unit may comprise a volatile memory, e.g. a random access memory (RAM) and the second memory unit may comprise a non-volatile memory, for example, a FLASH memory. The data processing unit 117 may also include a temperature sensor 143 and an analog-to-digital converter 145 for receiving an analog signal indicative of temperature from the temperature sensor and passing a corresponding digital signal to the first memory unit 139 to be recorded therein. The data processing unit includes an interface 144 for receiving signals indicative of the monitored pressure from the pressure sensor 108, and an interface 146 for communicating with the measurement circuit 122 which provides a measurement indicative of whether the data recording unit is being worn. The data processing unit also includes one or more of interface(s) 147, 149, 151, 153 for communicating and exchanging signals with other external devices, and an I/O controller 155 for controlling the transfer of data between internal memory of the data processing unit 117 and one or more external devices.

The data recording unit includes an external memory 157 and a real time clock 159 coupled to a respective interface 147, 149 of the data processing unit 117 and which are capable of communicating with its internal memory 139 via the I/O controller 155. The real time clock provides an indication of real time (e.g. date, time of day to the nearest hour, minute or second, for example) and enables event data to be time-stamped. Time-stamping enables the event to be correlated with other information or record(s) of an event. The real time clock may have a relatively low resolution of for example, one second. The data recording unit may be configured to provide a time stamp of higher resolution in order to accurately time stamp and distinguish different events which occur within the same one second or maximum resolution period. In some embodiments, higher resolution time-stamping is implemented by including a higher resolution timer, for example a millisecond timer and running the timer for at least part of the duration of an acceleration event. In some embodiments, the timer may continue to run for a period after each event. The timer may be controlled by the data processing unit and in some embodiments may be implemented by the CPU's internal clock. The higher resolution timer may run for a period of time, for example, at least for one second and provide time stamps for each event or a plurality of events that occur within that period. One of the interfaces of the data processing unit 151 includes a general interface port adapted for releasable connection to a peripheral device, such as a host computer. In the present embodiment, the interface 151 is a Universal Serial Bus (USB) interface, although in other embodiments, the interface 151 may comprise any other suitable interface.

In this embodiment, an additional non-volatile storage device 158 is provided, and may be used for storing variables and constants. The storage device may comprise a ferroelectric random access memory (FRAM) or other device. In this embodiment, the additional storage device 158 is connected to the I/O controller 155 via an interface 150.

The data recording unit also includes a power source 161 for providing electrical power to the data processing unit, and a regulator and power management module 163 for regulating power to the data processing unit. In this particular embodiment, the regulator and power management module 163 is coupled to a digital I/O interface 165 of the data processing unit and provides signals to the data processing unit via an analog-to-digital converter 167.

Electrical power for the data processing unit may be provided by non-rechargeable batteries, for example lithium batteries or other non-rechargeable batteries so that infrastructure associated with rechargeable batteries is not required. In some embodiments, battery voltage, whether provided by rechargeable or non-rechargeable batteries, may by read by the data processing unit, for example, via an analog-to-digital converter channel 167, and in some embodiments may be recorded with every event or at some other interval. This arrangement enables a determination to be made as to when the batteries are nearing the end of their life.

In other embodiments, rechargeable batteries may be used. In some implementations, the batteries may be charged using a connectorless charger using inductive or some other coupling.

In some embodiments, electrical power may be provided by using power saving techniques to recharge the batteries. Possible sources of energy for providing such power may include light, RF and vibration or other movement. Any one or more of these techniques or any other suitable technique may be used to provide energy for the data recording unit.

The data recording unit further includes a main clock 167 for providing clocking signals to the data processing unit 117.

Power Management

Embodiments of the data recording unit are designed to operate continuously for extended periods of time using stored electrical energy from a battery, for example, without any requirement for recharging, and the associated infrastructure, or replacing the battery. Some embodiments are designed to operate continuously for the duration of a typical "tour of duty" for military personnel which may last for up to six months. In normal operation, i.e. in the absence of exposure to a violent event, components which are required to record data are maintained in an "off" or inactive state where little or no power is drawn by those components. In this state, only the acceleration sensors, their associated circuitry (i.e. op-amps and band pass filters), the control circuit 119, the pressure sensor 108 and its associated circuitry, and, if provided, head sensor 120 and its associated circuitry are active. The comparators 121, 123, 125 of the control circuit and other "active" components may be selected to draw little power.

The data recording unit may be adapted to control activation of certain parts of the unit in response to sensing that the unit is being worn, and otherwise to maintain those components in an inactive state, where they draw little or no power. Advantageously, this arrangement enables power to be conserved where spurious high impact events may occur, when the data recording unit is not in use, for example, when a helmet to which it is mounted is not being worn but is dropped or knocked. In other embodiments, the data recording unit may be adapted to use this information after acceleration data has been recorded to determine whether or not to save or discard the data. For example, if the data recording unit determines that it is not being worn, it may decide to discard the acceleration data.

Figure 40:
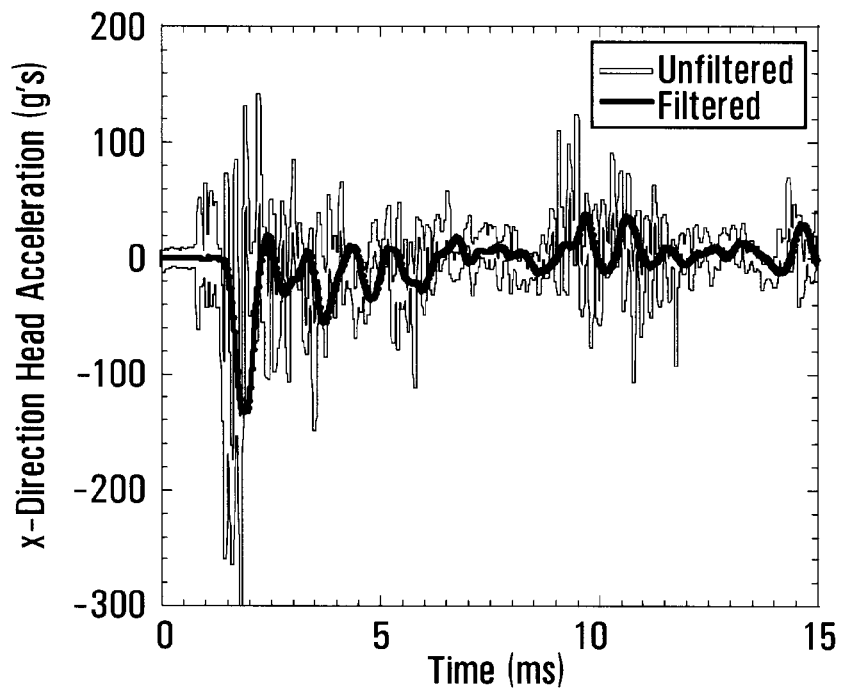
FIG. 40 shows an example of both unfiltered and filtered head acceleration traces in the x-direction (front-back) of a forward facing mannequin towards an explosion at a standoff distance of 3 meters, provided by 8.5 pounds of C4.
Figure 41:
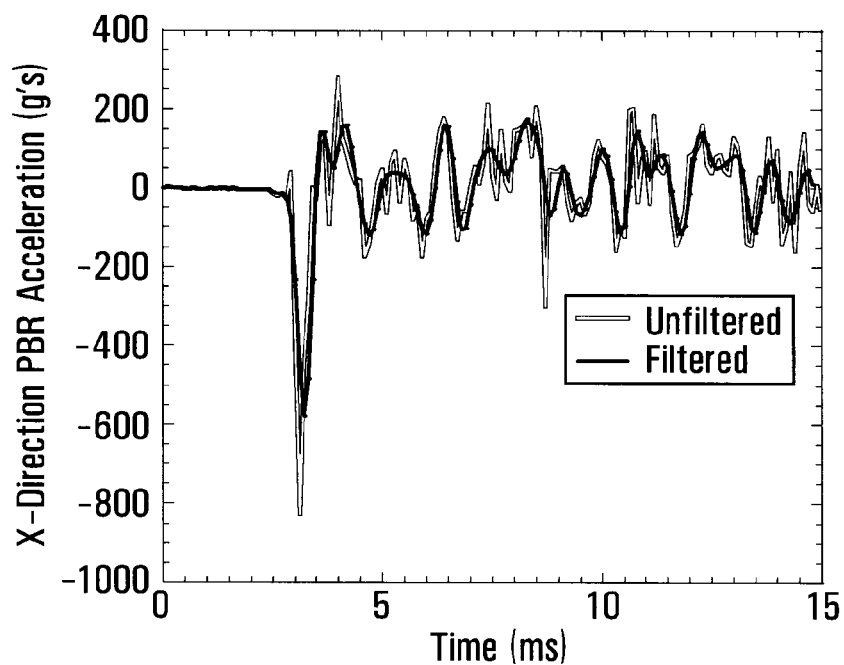
FIG. 41 shows an example of both unfiltered and filtered x-direction helmet acceleration traces as recorded by a data recording unit from a forward-facing mannequin during the explosion of FIG. 40.

The earliest stages of a blast event are critical in determining potential injury as this is when the maximum acceleration (s) occur. Typically, a subject is exposed to maximum acceleration values in the first few milliseconds of a blast event, for example, the first one or two milliseconds. The largest acceleration impulses are usually the first to arrive, and these initial impulses may only last one or two milliseconds. An example of the acceleration of the head of an anthropomorphic mannequin measured during a blast event is shown in FIG. 40. In this example, the mannequin's head is facing forwards towards the blast which is generated by a charge containing 8.5 pounds of C4 at a distance from the mannequin of 3 meters. The graph shows two x-direction (front-back) acceleration traces, one being an unfiltered trace and the other being filtered by a band pass filter which cuts off frequencies above about 1,650 Hertz. As can be seen, the peak acceleration occurs at about 0.5 milliseconds or 500 microseconds after the point at which the acceleration first begins to change. This peak acceleration only lasts for about 1 millisecond. FIG. 41 shows an example of filtered and unfiltered x-direction acceleration traces from the same blast event as that of FIG. 40, as measured by a data recording unit mounted to a helmet fitted on and secured to the mannequin's head. Again, the peak acceleration occurs within the first 500 microseconds and has a duration of about 1 millisecond. As described below, embodiments of the data recording unit are capable of switching from an inactive to an active state in response to acceleration measured by the sensors in a sufficiently short time to enable at least part of the earliest acceleration impulse, which may be the strongest, to be recorded.

When an event of interest occurs, such as an impact event or a blast event, as determined by the acceleration measured by one or more accelerometers reaching or exceeding the threshold value, a trigger signal 131 is output from the control circuit 119 and causes the data processing unit 117 to turn on and start recording. The threshold value may be set at about 50 gs, for example, or any other suitable value. In some embodiments, the data processing unit is triggered to start by an acceleration from any one or more of the acceleration sensors which exceeds a pre-set threshold. In some embodiments, the acceleration trigger threshold is set slightly below levels where injury is expected to occur. Advantageously, this provides sufficient time for the data processing unit to start up and capture the relevant acceleration waveforms. The data processing unit may employ a rapid start up system to jump from a deep sleep mode to full execution mode in a relatively short time, for example, about 100 microseconds.

Although in some embodiments, activation of the data processing unit may be controlled by switchably connecting the data processing unit to the power source, other embodiments of the data recording unit use one or more other techniques for rapid startup, an example of which controls startup through the main CPU clock. In one embodiment, the frequency of the main clock 132 can be varied between one or more operating frequencies, for example, 5.5 MHz (or any other suitable frequency) and a frequency of 0 Hz, for example. This may be implemented by switching the clock between ON and OFF states, for example in response to the trigger signal 131 from the control circuit 119. In one embodiment, the clock may comprise a solid state oscillator rather than a crystal oscillator to enable the clock to start quickly, for example in one or two clock cycles, which for a clock frequency of 5.5 MHz would take about 0.2 to 0.4 microseconds. When the main clock is in the OFF state, the CPU effectively sees that the clock has stopped, ceases to execute the current instruction and holds its current state. Although power to the data processing unit is available, power is conserved when the data processing unit is in the "inactive" state, and execution of instructions is suspended.

On receiving a trigger or control signal from the control circuit 119, the clock turns ON and provides a clocking signal to the data processing unit which, in response, becomes active and begins to execute instructions. Advantageously, controlling the data processing unit between active and inactive states using the main clock rather than switchably ON/OFF coupling the data processing unit to the power source reduces the amount of power required to activate the data processing unit.

In some embodiments, power for activating or driving the main CPU clock is provided both by the control signal 131 and the data processing unit. In a specific embodiment, the trigger signal lasts for a sufficient time to power the clock on until power for the clock can be supplied by the data processing unit. Any suitable means may be provided to maintain the control or trigger signal 131 at an appropriate level to provide power to the clock for a sufficient period of time until the data processing unit has started and can provide power to the clock. The means may for example be provided by an appropriate filter. In some embodiments, once the data processing unit receives an appropriate clocking signal from the main clock, the data processing unit executes a relatively short "house-keeping" program, which may include an instruction to provide power to the main clock. Once active, the data processing unit is able to receive and convert analog accelerometer signals to digital signals and record the digital signals.

In some embodiments, the data recording unit is adapted to record data for a predetermined length of time, for example, any time from about 1 to 15 milliseconds or any other suitable time, e.g. a length of time that is sufficient to record the maximum acceleration only or the latter plus a predetermined additional time. The data processing unit may also be adapted to maintain itself in the active state for a predetermined period of time and then cause itself to change to an inactive state to conserve power. This may be implemented, for example, by configuring the data processing unit to turn off power to the clock a predetermined period of time after the CPU becomes active. Once in the inactive state, the data processing unit remains in that state until another acceleration event causes the data processing unit to change to the active state.

In the present embodiment, the analog waveform from each sensor is converted by a respective A to D converter to a digital signal and stored in the first, volatile memory unit 139.

The A to D converters may be adapted to operate at any desired sampling rate, for example, 10 kHz or any other suitable frequency. The band pass filters may be configured to ensure that the signals to the A to D converters do not fluctuate faster than half the A to D sampling frequency to reduce frequency and amplitude errors in the digitized waveforms. Each of the first, second and third A to D converters may be adapted to convert simultaneously so that the direction of each instantaneous acceleration can be determined efficiently. When an event occurs in which the acceleration is sufficient to activate the data recorder, acceleration data is received by the first memory unit and recorded therein with the time of the event, as provided by the real time clock 159, and the temperature from the temperature sensor 143. After capturing an event in the first memory unit 139, the data processing unit may be adapted to make a decision either to store or not to store the data in non-volatile memory, based, for example, on the measured acceleration. Such a determination may be made based on whether a peak acceleration exceeds an injury threshold or not. The data recording unit may be provided with one or a plurality of such threshold(s). The threshold(s) may be set by an external computer, via a suitable interface, for example, interface 151. In one embodiment, a threshold may be set at 100 gs, for example, or any other suitable value.

In embodiments which include a sensor for sensing whether or not the data recording unit is being worn, such a determination may be used to control whether or not acceleration data stored in the first memory unit is transferred to the second memory unit or discarded. For example, if a determination is made that the data recording unit is not being worn, the data processing unit may decide not to transfer the acceleration data to the second memory unit.

Embodiments of the data recording unit are adapted to use pressure data from the pressure sensor to control the storage of acceleration data in memory, as will be discussed in more detail below under "Memory Management". When a pressure is sensed at or above a predetermined threshold, an indication of such may be stored with the event acceleration data, and/or the data may be stored in such a way that it can be distinguished from other acceleration data which was not accompanied by such a pressure.

If the decision by the data processing unit is to retain the data stored in the volatile memory 139, data is then transferred from the volatile memory to the non-volatile memory unit 141, where the data may be stored indefinitely without requiring electrical power. Once the data has been transferred from the first to the second memory unit, the data processing unit shuts itself down, entering a "sleep" state, and waits for the next event. If the data processing unit decides not to keep the event data, the data processing unit shuts itself down without transferring the event data to non-volatile memory, resulting in the loss of the data recorded in the volatile memory 139.

As described above, the data recording unit may be adapted to enable electrical power to one or more of the acceleration sensors and/or the data processing unit to be turned on or off to extend battery life. This feature may be used to prolong battery-shelf-life so that the unit can be activated only when it is brought into service rather than during periods of storage or non-use. For this purpose, the data recording unit may include a switch which may be manually accessible on the device or a switch (e.g. power management module 163, 164) accessible via a communications port or interface, for example interface 151. In this latter case, an external control signal may cause the switching module 163, 164 to change state from OFF to ON and the switching module may be adapted to maintain itself in the ON-state thereafter without further application of the control signal. Electrical power to the unit may be switched off in a similar manner.

Electrical power may be provided to the data recording unit other than via the batteries to enable the data processing unit to be turned on and data downloaded from the internal non-volatile memory 141 and/or the external memory 157. Advantageously, this feature allows data to be retrieved in the event that the batteries no longer have sufficient energy to activate the unit for this purpose.

In the event of a blast, it is possible that the pressure shock wave will arrive and completely pass the data recording unit before any acceleration is detected. Thus, in some embodiments, the pressure monitoring circuit is adapted to retain a measurement of the pressure until the data processing unit is able to read it, for example, by becoming active through the acceleration data. In some embodiments, a measurement of pressure may be used to activate the data processing unit either instead of or in addition to an acceleration measurement. Using pressure may provide more time to activate the data processing unit or enable more acceleration data to be recorded if there is some delay between the sensing of an increased pressure and the sensing of an acceleration. If a pressure sensor is used to activate the data processing unit, it may be implemented in a similar manner described above with reference to the acceleration measurement. In this case only one pressure sensor may be used to measure pressure and provide a signal to the control circuit 119. The data recording unit may be adapted to activate parts of the data recording unit required to record incoming data in response to determining whether the pressure reaches a predetermined threshold. The predetermined threshold may be one which provides reasonable certainty that the acceleration event was caused by a blast or explosion as distinct from another event.

Memory Management

As described above, in the present embodiment, memory associated with the data recording unit includes a first memory unit 139 for receiving and recording data from the A to D converters, a second memory unit 141 for receiving and storing data from the first memory unit, and an external memory unit 157. In some embodiments, the first memory unit comprises a random access memory to capture and store high speed samples from the A to D converters and to keep the data until a decision has been made as to whether to save it. To reduce power consumption, data which is to be saved is transferred to the second, non-volatile memory unit. The second memory unit 141 may have the capacity to store simultaneously event data from a number of separate events. In some embodiments, data stored in the second memory unit may be transferred to the external memory unit 157. In some embodiments, data from a number of separate events may be transferred from the second memory unit 141 to the external memory unit 157 in a single or the same write operation to reduce the power which would otherwise be required if data from each event is transferred in separate, discrete write operations. In some embodiments, the data processing unit is adapted to control the transfer of data from the second memory unit to the external memory unit once a predetermined number of events have been recorded in the second memory unit. In one embodiment, the data processing unit may be arranged to transfer data only when more than three, for example, ten events have been accumulated and to transfer those ten events in a single write operation. In other embodiments, the number of accumulated events prior to transfer may be any other number and the number of events transferred in a single write operation may also be any other number. Preferably event data for more than one event is transferred in a single write operation.

In some embodiments, the data recording unit is adapted to store acceleration data resulting from a blast in a manner which allows such data to be discriminated or differentiated from other stored acceleration data. In some embodiments, this may be implemented by reserving a section or sections of memory in the second and/or third memory units, for example, only for blast data as determined by the pressure sensor or other means. This partitioning of memory may be implemented in such a manner as to prevent blast data from being overwritten by non-blast acceleration data, for example, if the memory becomes full. Advantageously, this enables blast acceleration data to be preserved where memory space is limited. The data recording unit may be configured to enable non-blast acceleration data to be overwritten by blast acceleration data, as necessary, for example, when the memory becomes full. Acceleration data which results from a blast may be indicated, labeled or tagged as such by storing a suitable indicator with the data or by indicating that the address at which the data is stored is blast data. The indicator may be used to prevent the data from being overwritten. On the other hand, or in addition, non-blast data may be indicated as such and such an indication may be used to enable the non-blast data to be overwritten by blast data, as necessary. Once indicated as blast data, such an indication may be used to ensure that it is not overwritten by other data.

In some embodiments, the non-volatile memory comprises a solid-state memory to withstand the high forces experienced by the data recording unit. The amount of memory may be limited to conserve electrical power, reduce size and save weight. The non-volatile memory of the data processing unit may comprise a flash memory, for example, an electrically erasable programmable read-only memory (EEPROM), and may be used to store firmware and accumulate data from a plurality of events before the data is archived to the external memory. The external memory 157 may also comprise a solid state flash memory. As mentioned above, the external memory 158 may comprise a ferro-electric RAM used for high-speed non-volatile storage of variables and constants.

In some embodiments, other data may be stored in one or more of the available memories. This may include data which is specific to the data recording unit to enable the data recording unit to operate and/or recorded data to be processed. The data may include offset value(s) for the acceleration sensor(s). For example, a sensor may provide a non-zero output in the absence of any acceleration. Offset values may be used by the control circuit 119 to modify/correct the threshold value that controls activation of the data processing unit, and/or to modify/correct threshold values used to determine whether to keep the recorded data or not. The values may include multiplication factor(s) resulting from any signal amplifiers, or other conditioning. The data may be available to be output to an external device via a suitable interface for subsequent use, which may include correcting/adjusting recorded data for analysis and/or other processing. Storing such values in or with the unit is particularly convenient, as it obviates the need for the values to be stored elsewhere, for example in a central database, their associated input thereto, which may be prone to error, and their maintenance therein.

Pressure Sensor

In some embodiments, the data recording unit may employ a pressure sensor that is normally used as a force sensor. The sensor may be based on a thin semi-conductive ink (or layer), screened (or applied) onto conductive electrodes, which are themselves silk-screened (or applied) onto polyester sheets (or other dielectric material). These sensors are laminated into thin strips that change their resistance when force is applied. The extremely low mass and physical geometry of these sensors make them insensitive to accelerations which enables them to distinguish between acceleration and pressure. At a force of 6,000 Gs, even one gram generates 6 kilograms of inertial force.

A secondary benefit of this sensor technology is that it allows the sensing surface to be grounded, which helps to maintain EMI/EMC (Electromagnetic Impulse/Electronic countermeasures, e.g. signal jamming) integrity even though the pressure sensor is exposed to atmosphere, for example through a port.

In other embodiments, another pressure sensor developed by the inventors provides a zero-power pressure sensor, which is impervious or insensitive to acceleration. In some embodiments, the sensor uses two bender elements back to back, but separated by a shock wave shield, such that only one element is exposed to pressure pulses. A bender element may comprise a Piezo-electric ceramic disk bonded to a suitable substrate, for example a metallic (e.g. brass) substrate. Conceptually, one element is intended to measure acceleration, and one element is intended to measure acceleration plus pressure. The acceleration-only element is simply to generate an acceleration signal which is used to cancel any acceleration signal generated in the pressure sensing element. If the elements are not perfectly matched, the acceleration signal may need to be scaled to achieve optimum cancellation. Cancellation may be achieved by connecting the elements in series with one reversed, or by analog or digital subtraction. If cancellation is performed by downstream analog or digital processing, the elements' signals can be kept separate, allowing the acceleration sign to be used for triggering the data processing unit. This is useful as the signal is generated by a sensor that is continuously sensing, without consuming any power, and the sensors may generate a large enough signal to trigger the data processing unit directly.

A variation of this dual-element, acceleration-canceling, pressure sensor may be implemented using poly-vinyl-idene-flouride (PVDF) Piezo-film. This film is sufficiently flexible to be folded to create the acceleration canceling signal in a single device, instead of using two separate elements. It also has low mass, allowing single element operation even without folding, but in this case a stable base may be required, since any flexing of the film generally cause a relatively large signal to be produced.

In some embodiments, a plurality of pressure sensors may be used to determine the direction of a shock wave, although such an arrangement would require multiple sensors, for example, 2, 3 or 4 or more. In some embodiments, the pressure sensors are separated some distance apart, such that a shock wave arrives at each sensor at a different time. By measuring the time of arrival of a shock wave at various sensors, it is possible to compute from which direction the shock wave came. In some embodiments, at least four sensors are provided, at least one, and possibly each of which is in a different plane and such an arrangement enables a complete determination of the direction of the shock wave to be made. With only three sensors, it is possible for a shock wave to reach all three at the same time and in this case it may be unknown as to which side of the plane (defined by the location of the three sensors) the wave came from.

Head Sensor

In some embodiments, head sensing may be performed once per event so that the head sensing circuit could be turned off until an event is detected. Once an event has been detected, the head sensing circuit can be turned on and a determination made as to whether the data recording unit is being worn. In other embodiments, the head detect circuit may be implemented to cause other circuitry of the data recording unit to be turned off when the helmet or data recording unit is not being worn which may further conserve battery life. However, in this arrangement, the head sensing circuit is continuously active. To make this feasible, one aspect of the present invention provides a capacitance measurement circuit which, in some embodiments, requires very low power. An example of an embodiment a capacitive proximity detector circuit is shown in FIG. 36.

Figure 36:
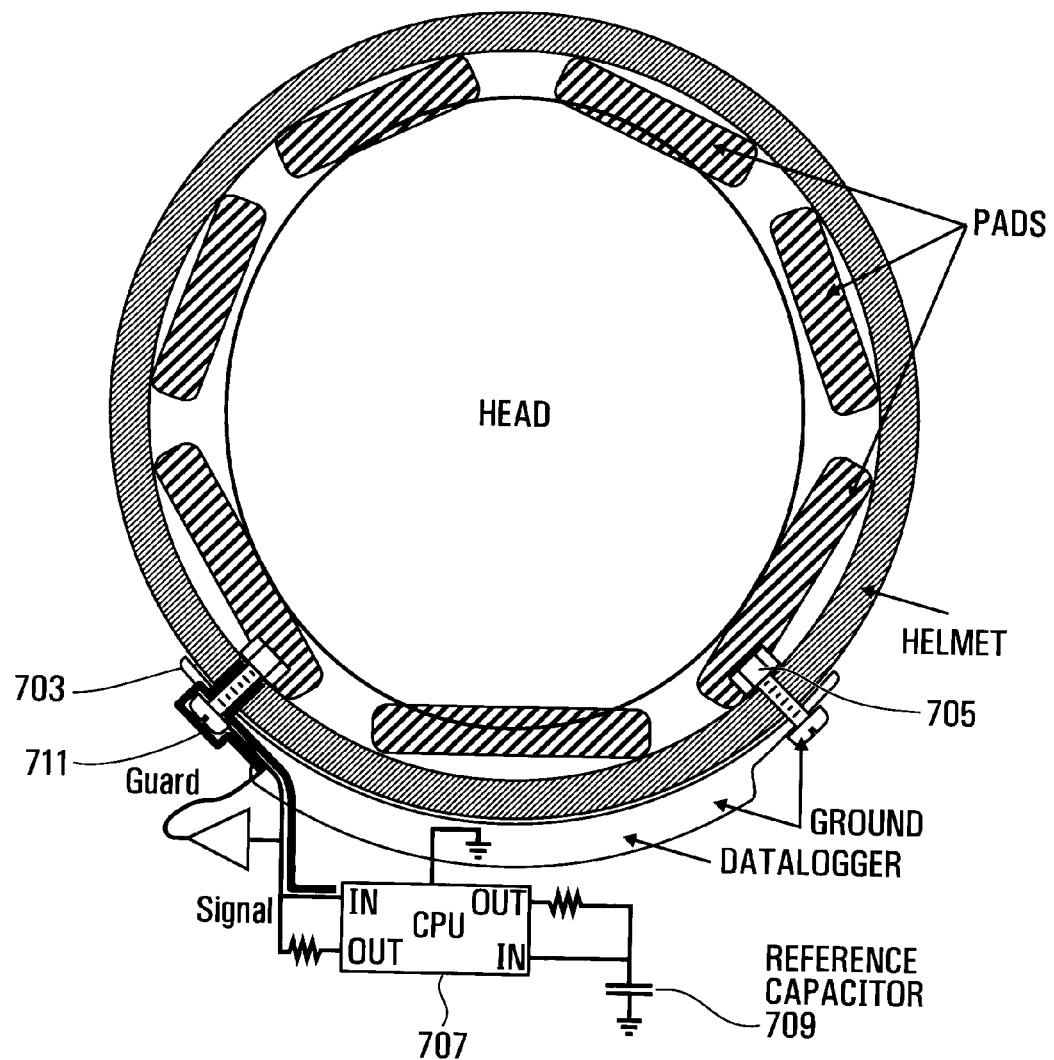
FIG. 36 shows a schematic and cross-sectional view of a helmet and data recording unit according to an embodiment of the present invention.

Referring to FIG. 36, the capacitance sensor comprises first and second electrically conductive spaced apart elements 703, 705 which form opposed elements of a capacitor and which are disposed within the helmet shell. The space between the elements is provided by the interior space of the helmet for accommodating a person's head. When a head is present in the helmet, the head modifies the measured capacitance between the two elements by increasing the dielectric. Advantageously, in the present embodiment, the capacitor elements 703, 705 are provided by two fasteners for fastening the data recording unit to the helmet, and in this embodiment, each fastener comprises a bolt or screw and corresponding nut. In the illustration, the head of the screw is on the outside of the helmet and the nut is on the inside, although in other embodiments, the screw head may be on the inside and the nut on the outside of the helmet. The fasteners may be accommodated in existing through holes, thereby avoiding the need to make additional through holes in the helmet shell which may compromise its protective performance. In other embodiments, the conductor elements 703, 705 of the capacitor sensor may be provided by any other conductive elements, for example conductive strips or plates mounted on the inside of the helmet shell.

In this example, one of the conductive elements 703 is connected to a capacitance detection circuit 707 and the other conductive element 705 is connected to ground. A reference capacitor 709 is also connected to the detection circuit 707. In this embodiment, the active element 703 is shielded with a driven guard 711. This technique buffers the sensed signal and applies the buffered signal to the guard. The guard may comprise a shield cap surrounding the part of the conductive element which is located on the outside of the helmet, and which, in this example, comprises a screw head. Advantageously, this arrangement prevents the circuit from erroneously detecting objects outside the helmet. In other embodiments, a normal ground could be used to shield detection of external objects, but such a ground shield or cap is likely to result in a significant parasitic capacitance, making it more difficult to detect a small change in capacitance due to the presence of a person's head.

In some embodiments, the head sensor may be adapted simply to provide an indication of whether or not a head is present in the helmet. In other embodiments, the head sensor may be arranged to provide an indication of the position of a head in the helmet and this information may be used in determining helmet-to-head correlation. For example, the head sensor may be used to determine the relative position between a head and the helmet during an acceleration event and used to correlate helmet acceleration with head acceleration.

Sensors

In addition to acceleration sensors, the data recording unit may include a temperature sensor. The temperature sensor may be included in the data processing unit or may be separate therefrom. Since the accelerometer sensors may exhibit some temperature dependence, providing a temperature sensor enables temperature compensation to be performed on the data to improve accuracy of the measurement, if required.

Figure 2:
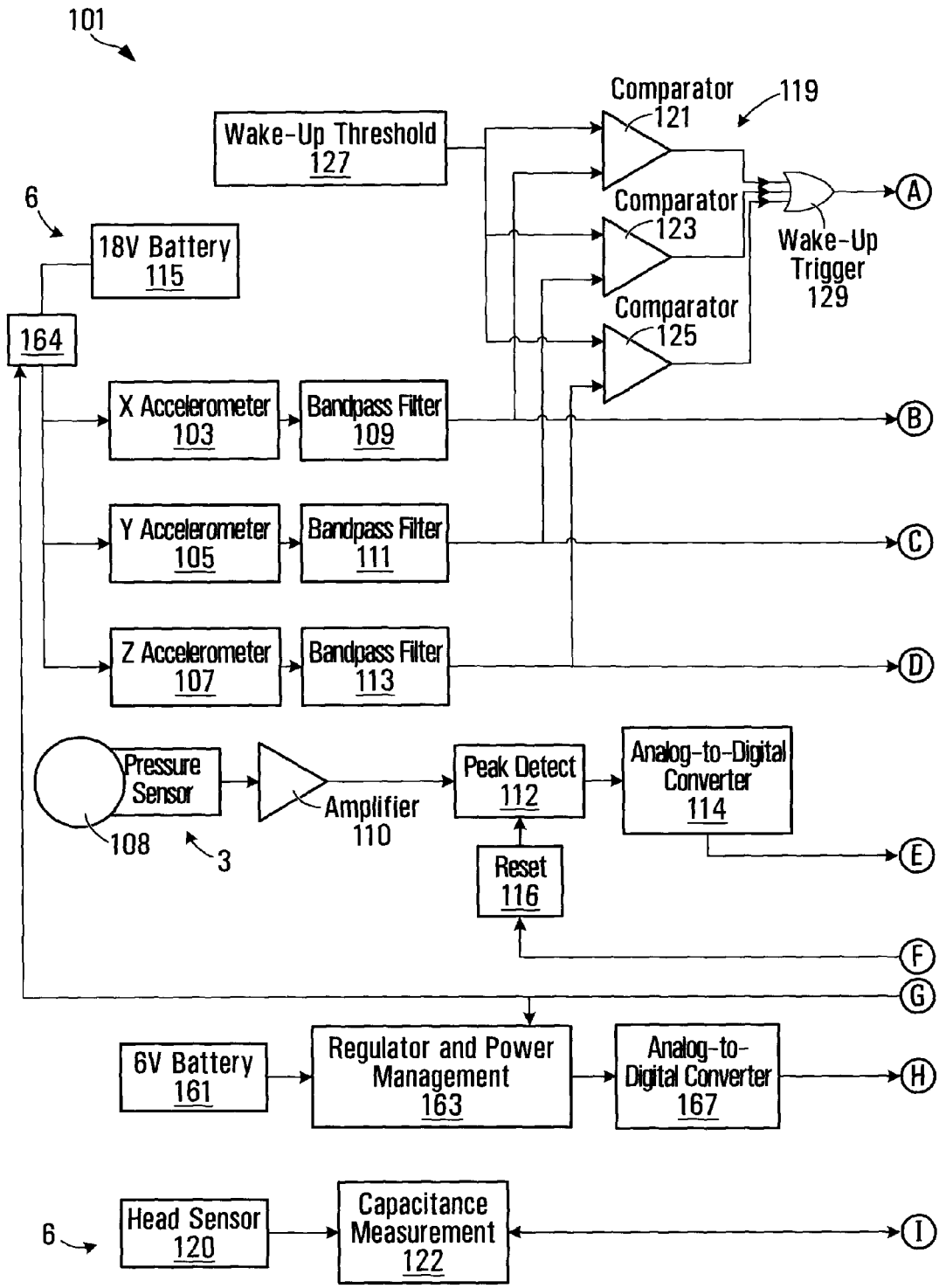
FIG. 2 shows a block diagram of a data recording unit according to another embodiment of the present invention.
Figure 2:
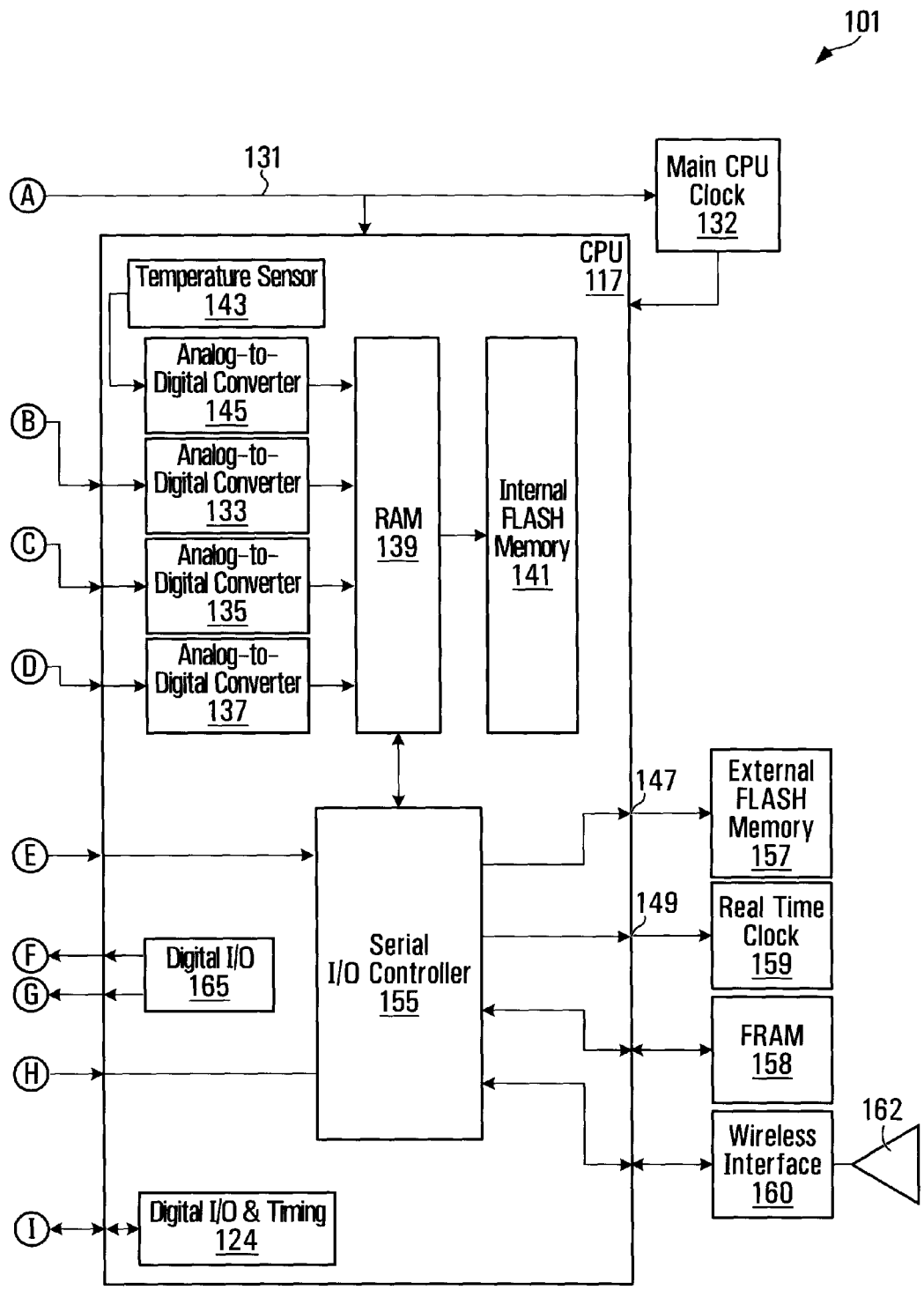

Embodiments of the data recorder may include a communication port for enabling data to be downloaded to an external device. The port may be one which requires a physical wireline connection. In some embodiments, the data recorder may include a wireless interface for communicating with an external device to enable, for example, data to be downloaded using a wireless connection. An embodiment of a data recording unit having a wireless interface is shown in FIG. 2. The data recording unit of FIG. 2 is similar to that of FIG. 1 and like parts are designated by the same reference numerals. The data recording unit includes a wireless interface 160 and an antenna 162 for transmitting and/or receiving wireless signals from an external device.

In some embodiments, the protocol used for transferring data may enable secure data transfer over short ranges with efficient, low power operation. The protocol may be based on the IEEE 802.15.4 Standard for the physical and media access control layer, an example of which is known as ZIGBEE. The protocol may also allow data to be downloaded from a number of separate data recording units.

Advantageously, the provision of wireless download capability may significantly reduce the number of manual operations associated with downloading data and may provide many other potential uses of the data recording unit. Embodiments of the data recording unit implemented with wireless download capability may use rechargeable or replaceable batteries. A controller may be provided to control the timing of a wireless download event so that the unit only transmits or generates a RF signal when required.

Embodiments of the data recording unit may include an optional indicator, which may comprise a visual indicator such as a red or green light or both to indicate for example, if acceleration data relevant to a potential injury has been recorded. The indicator may provide additional information, such as how many blast events have been sustained and/or an indication of the magnitude of the most severe event sustained. The indicator may also provide other information, which may be encoded and displayed as one or more digits. In some embodiments, the indicator may comprise an LCD, LED or other display.

In some embodiments, components of the data recording unit may be mounted on a common substrate. The substrate may comprise a circuit board or circuit card which provides electrical interconnection between various components. The substrate may be adapted for mounting components of the data recording unit on one or both sides thereof. In addition to the components being held to the substrate by means of their respective mounting thereto, additional means may be provided to fixedly secure the position of the components relative to the substrate and/or with respect to each other. The additional means may, for example, comprise a pourable or fluid substance in which components of the data recording unit are at least partially or fully embedded and which subsequently sets or cures into a solid or solid-like substance. After setting, the substance may be relatively rigid or more resilient than before setting and capable of flexing to a certain degree. Components of the data recording unit may be placed in a mold and the substance then introduced, e.g. poured into the mold and allowed to set. The mold may be shaped to define the shape of one or more intermediate stages of the final product (if molding is performed in a number of stages) and/or shaped to define the final shape of the product. In other embodiments, the mold itself may form part of the final product, for example, a part of a casing for the product. Further examples of embodiments of the data recording unit and its fabrication will be described below with reference to FIGS. 3A to 35.

FIGS. 3A and 3B show an example of an arrangement of electronic components of a data recording unit 101 mounted to both sides of a common substrate 102. The components include a data processing unit (CPU) 117 and other devices mounted on one side of the substrate 102, and an acceleration sensor 104, a pressure sensor 108 and a number of battery cells 106a to 106f, 110 and 112 for providing power to the data recording unit mounted on the other side of the substrate 102. In other embodiments, components of the data recording unit may be mounted in any other suitable configuration, and all components may be mounted on one side of the substrate or on both sides.

Figure 4:
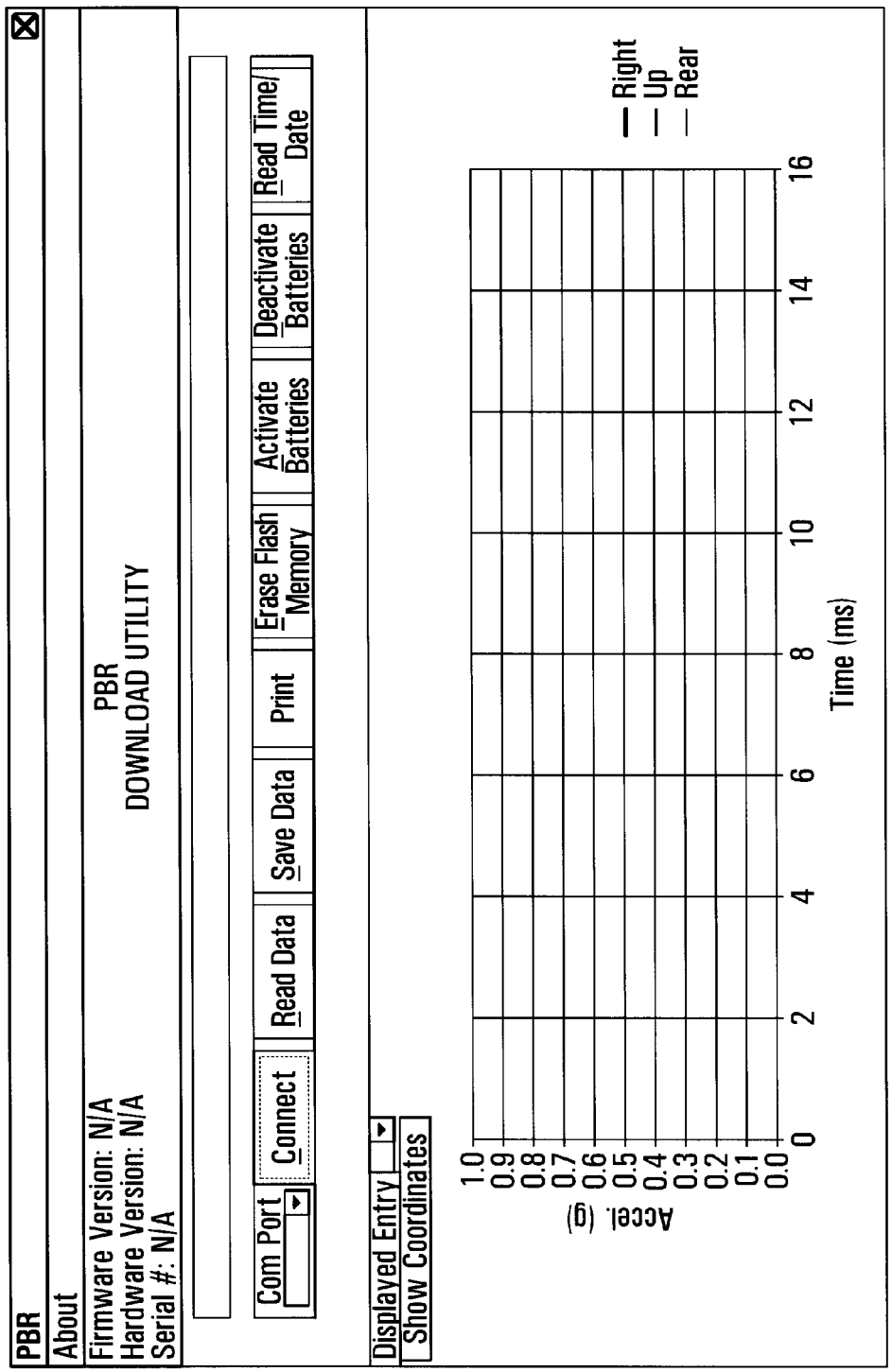
FIG. 4 shows an example of a screen shot of a graphical user interface for showing acceleration data according to an embodiment of the present invention.

FIG. 4 shows an example of a graphical display for displaying acceleration data recorded by the data recording unit. The graphical display may comprise an external device which receives the acceleration data stored in the data recording unit. The graph enables acceleration data from each accelerometer to be display separately or two together in any combination or all three simultaneously, and/or also allows the resultant vector acceleration derived from all three sensors to be displayed (either together with one or more other traces or separately).

Figure 5:
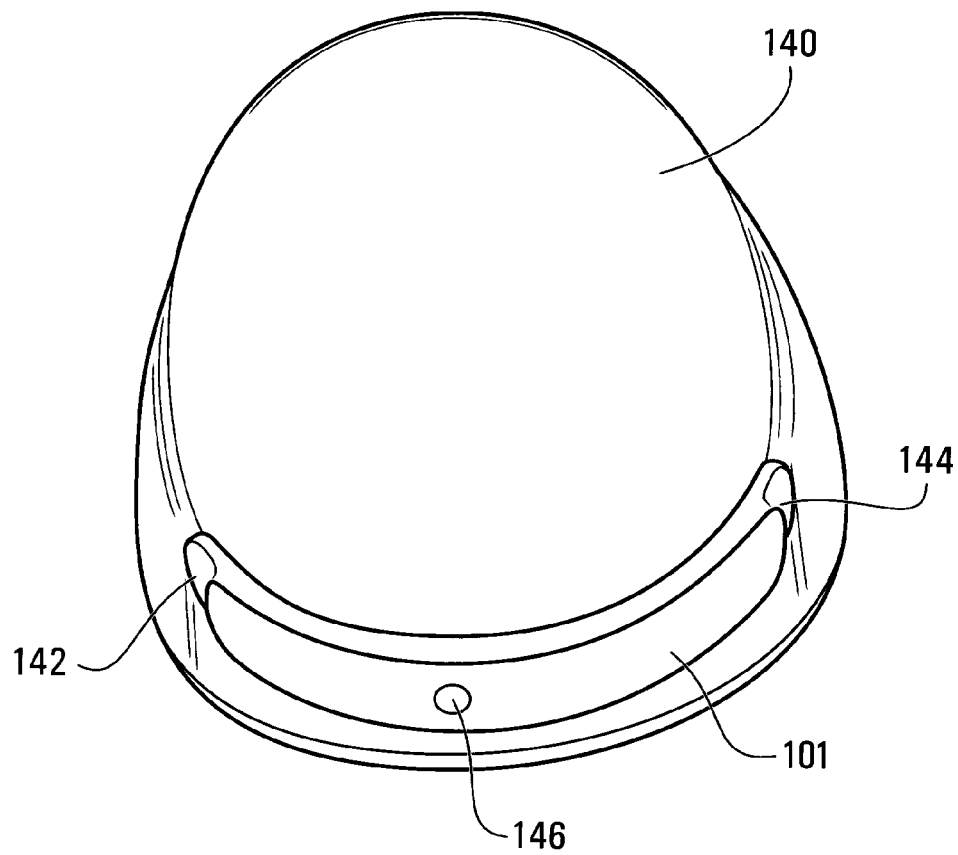
FIG. 5 shows a front perspective view of an embodiment of a data recording unit mounted on a helmet.

Referring to FIG. 5, an example of a data recording unit 101 is shown mounted on the back of a protective helmet 140. The data recording unit comprises a unitary piece in the shape of an arched or arcuate strip whose inside face generally conforms to the shape of the helmet against which it is placed. The unit includes first and second mounting holes 142, 144 for receiving screws or bolts which pass through the helmet shell. The mounting holes 142, 144 are positioned to register with existing mounting holes in the helmet shell, thereby obviating the need for making additional holes which might compromise the protective performance of the helmet. In this embodiment, the existing mounting holes provide a means for attaching the internal head suspension system to the helmet. In this embodiment, the data recording unit includes an aperture 146 for exposing the pressure sensor to atmosphere.

In other embodiments, the data recording unit may have any other shape and may be mounted to any other part of a helmet.

Referring to FIGS. 6 to 10, the pressure sensor 108 of the data recording unit comprises a thin sheet which is configured such that an electrical property of the sheet changes when a pressure is applied to the major surface of the sheet. In some embodiments, the electrical property may be electrical resistance. In one embodiment, the pressure sensor comprises a sheet of dielectric or insulating material, for example, a polymeric sheet (e.g. polyester) supporting a layer of semi-conductive material, for example, semi-conductive ink, whose electrical resistance changes when pressure is applied. Conductive electrodes are provided for enabling the resistance of the semi-conductive layer to be measured. The electrodes may also be formed on the sheet. The sensor may include a cover layer for covering the semi-conductive layer and which may be formed of a similar material to the other sheet.

Figure 8:
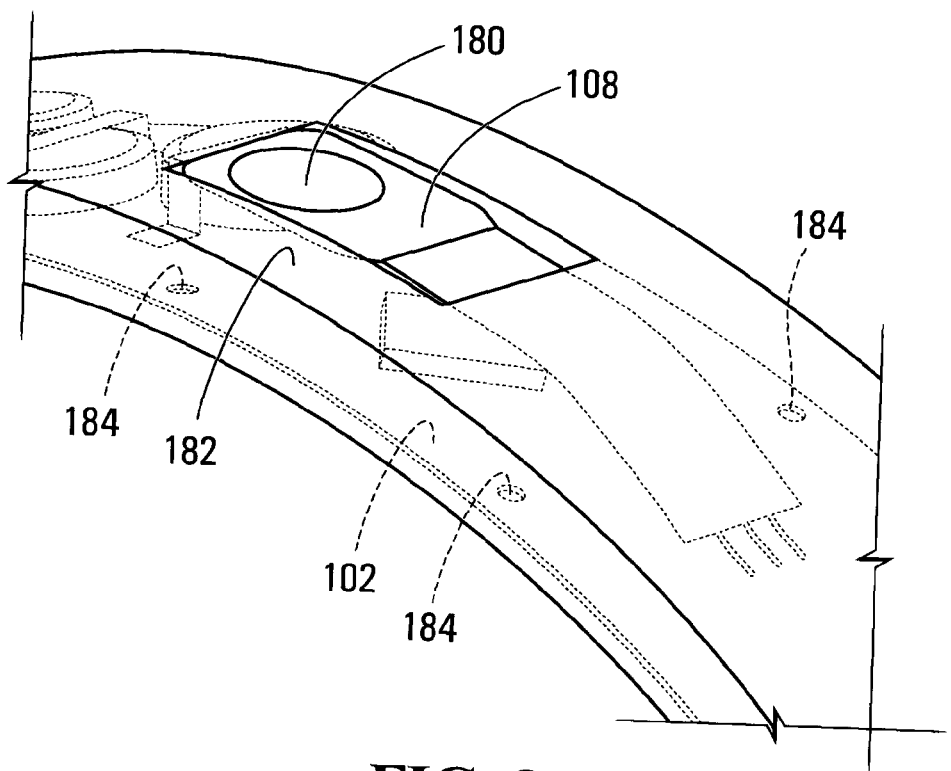
FIG. 8 shows a perspective view of a pressure sensor for a data recording unit according to an embodiment of the present invention resulting from a first molding process.

As shown in FIG. 8, a part 180 of the laminated sheet forms the active part of pressure sensor and is supported below by a support member 182 at a raised position above the substrate 102 on which electronic components of the data recording unit are mounted. The support 182 may comprise any suitable material and may be rigid or resilient, and in one embodiment, comprises a rubber plug.

An example of a method of fabricating the data recording unit may include any one or more of the following steps:

(a) After the electronic components have been mounted to the circuit board, the components are coated with a conformal coating which has been found by the inventors to reduce surface cracking of the substrate and surface stress on joints and interconnections between the various components which may otherwise occur if the molding compound such as epoxy is in direct contact with the components and substrate.

Figure 6:
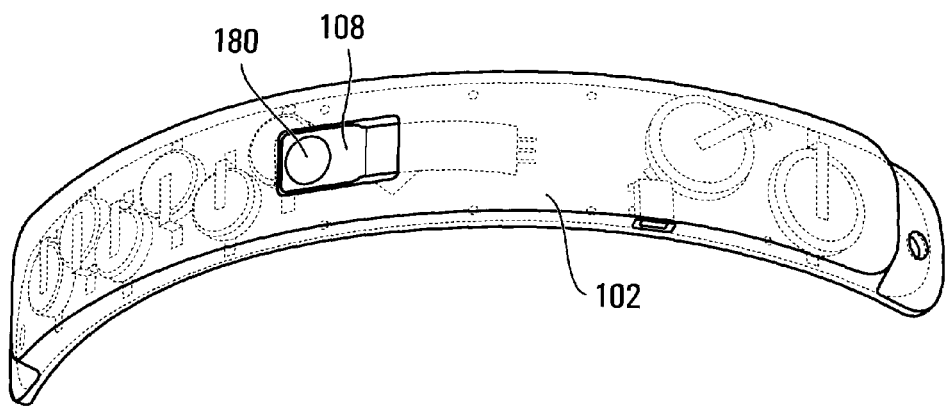
FIG. 6 shows a perspective view of components of a data recording unit mounted on a substrate.
Figure 7:
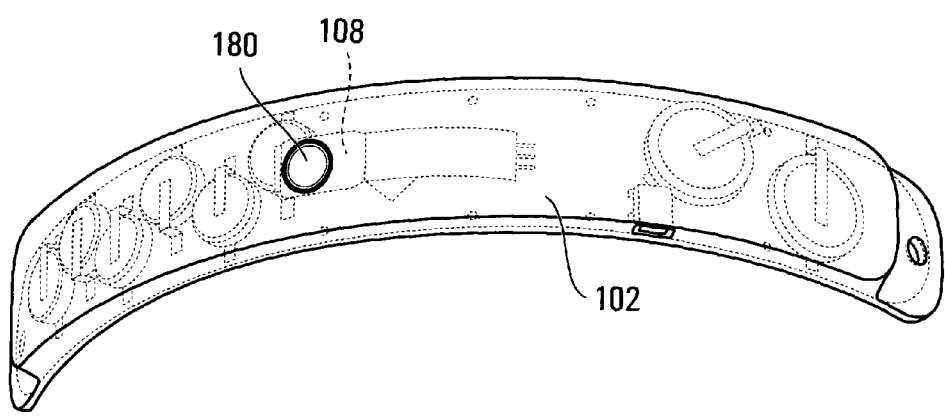
FIG. 7 shows a view of components of a data recording unit mounted on a substrate.

(b) A mask is applied to the area of the pressure sensing material which will define the pressure sensor, this being the circular area 180 shown in FIGS. 6 to 8, although the area may be any other suitable shape or size. The mask may be provided by any suitable material and in one example comprises Kapton tape.

Figure 10:
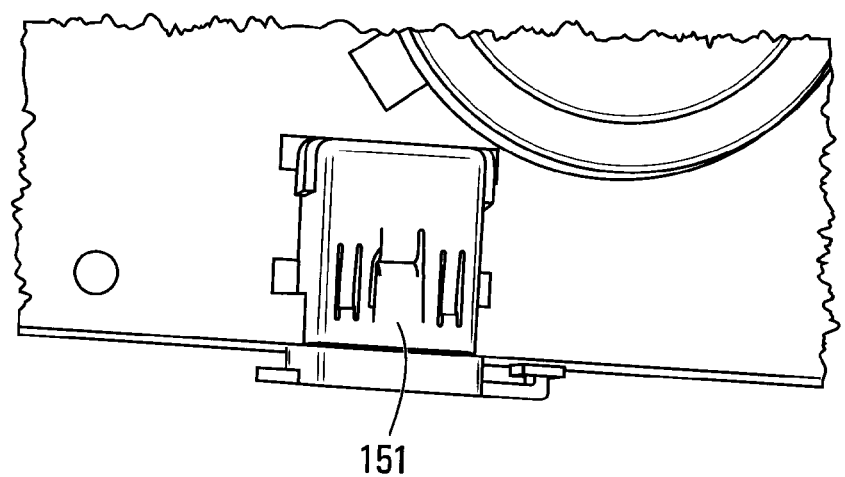
FIG. 10 shows a side view of a USB port incorporated in an embodiment of a data recording unit.

(c) FIG. 10 shows an example of a communication port 151, for example, a USB connector for coupling the data recording unit to an external device. Prior to molding, the connector is also masked by any suitable means, and in one embodiment, the masking material comprises a combination of Kapton tape and silicon grease.

(d) The circuit card assembly is positioned in a casting mold and mounting holes 184 (or projection(s), not shown) formed in the circuit card may be used to locate the circuit card in the desired position within the mold.

(e) Potting compound (e.g. epoxy) is poured or otherwise introduced into the mold and allowed to cure. This may result in the product shown in FIG. 6, for example. During this process, the potting compound is not permitted to cover that portion of the pressure sensor which is supported by the support 182, in order to allow the pressure sensor to be folded back and a metallic coating applied to isolate the data recording unit from electromagnetic impulses and other electromagnetic signals which may interfere with its performance.

(f) After the first molding operation, the resulting part is coated with a suitable metal or metallic coating to provide EMI protection. The coating may be suitable for both emissivity and susceptibility and may, for example, comprise copper nickel plating. The metalization may be applied in any suitable manner, for example, by platting the part with a metal plating.

Figure 9:
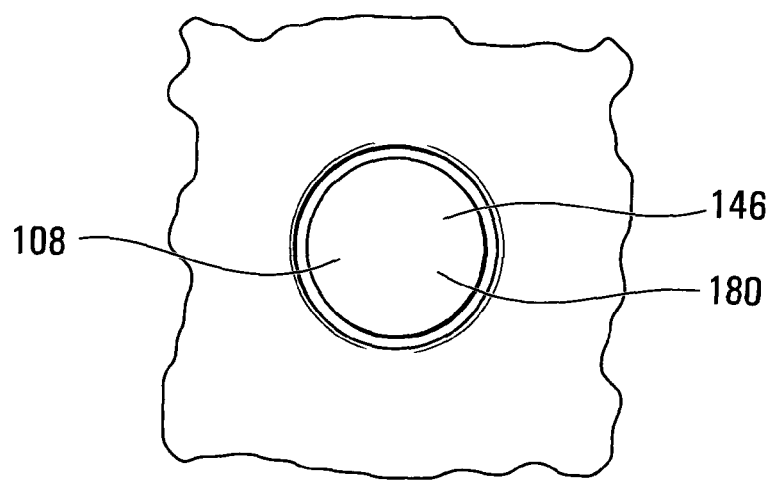
FIG. 9 shows a top view of the pressure sensor of FIG. 8 after a second molding process.

(g) After applying metalization to the unit, the unit is again encapsulated in a potting compound. In this second potting phase, a solid piece, such as a silicon rubber plug, is placed over the active region 180 of the pressure sensor to create a negative of the opening required for the pressure sensor to be exposed to ambient pressure. The connector 151 is also masked for the second potting phase to ensure that it remains accessible. After the second potting phase, the masking is removed and the product may have the form shown in FIG. 7. FIG. 9 shows a more detailed view of the resultant aperture defined by the second phase potting compound which exposes the pressure sensor to atmosphere.

(h) The product resulting from the second potting process may be coated with an additional layer of protective material which may be more abrasion resistant than the cured potting compound. The additional layer may also help to prevent shattering and may be less brittle than the potting compound and generally assist in strengthening the structure. The coating may comprise any suitable material, an example of which is Line-X™, which is normally used as a truck bed liner coating.

Figure 11:
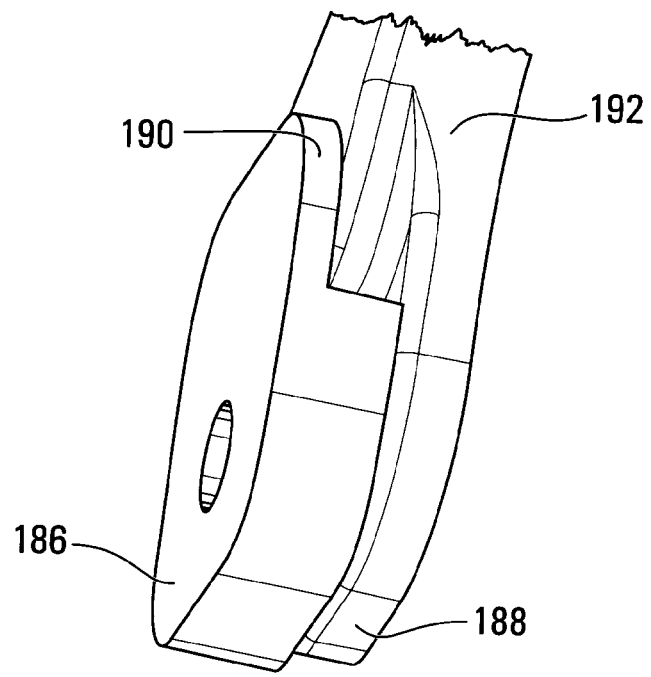
FIG. 11 shows a perspective view of a mounting mechanism for mounting the data recording unit to a helmet.
Figure 12:
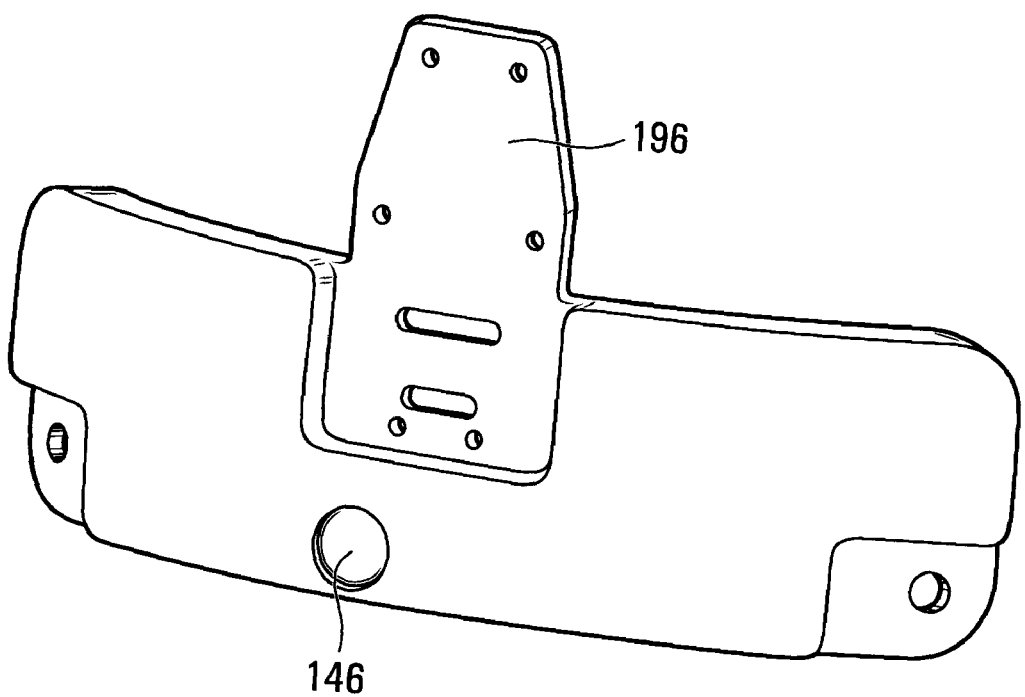
FIG. 12 shows a front perspective view of a data recording unit according to an embodiment of the present invention.
Figure 13:
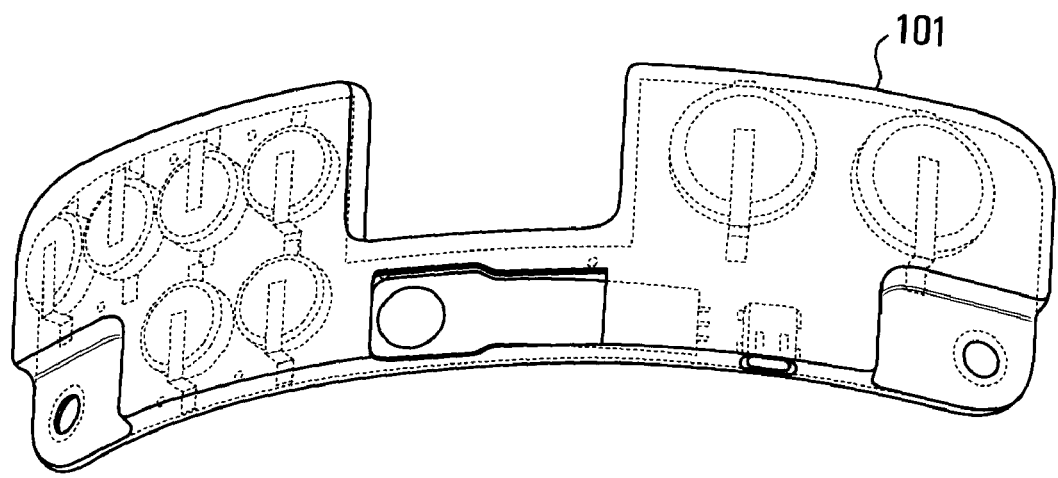
FIG. 13 shows an example of components within the data recording unit of FIG. 12.
Figure 14:
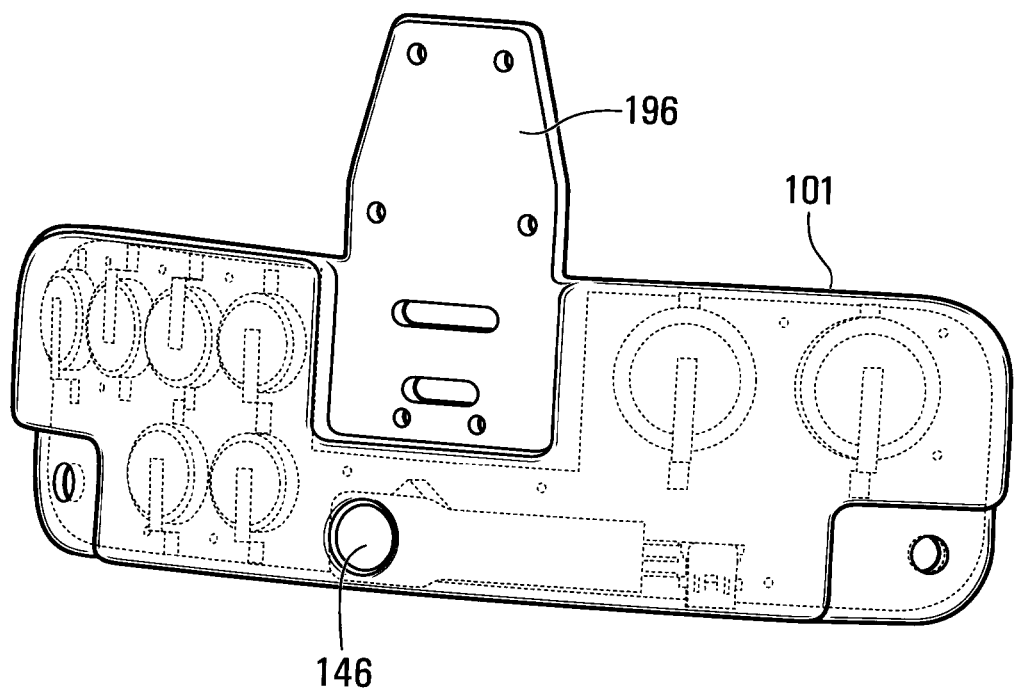
FIG. 14 shows a perspective view of the data recording unit of FIGS. 12 and 13 resulting from a molding process.
Figure 15:
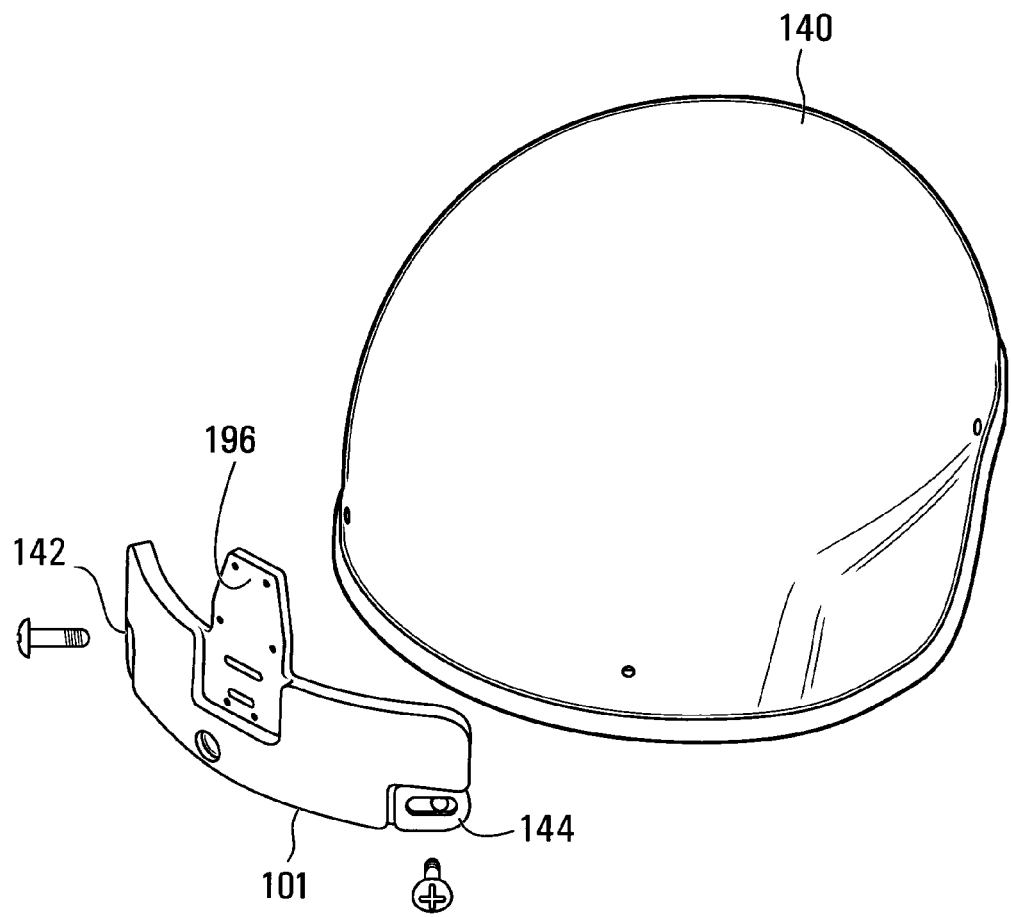
FIG. 15 shows an example of a mounting scheme for mounting the data recording unit of FIGS. 12 to 14 to a helmet.
Figure 16:
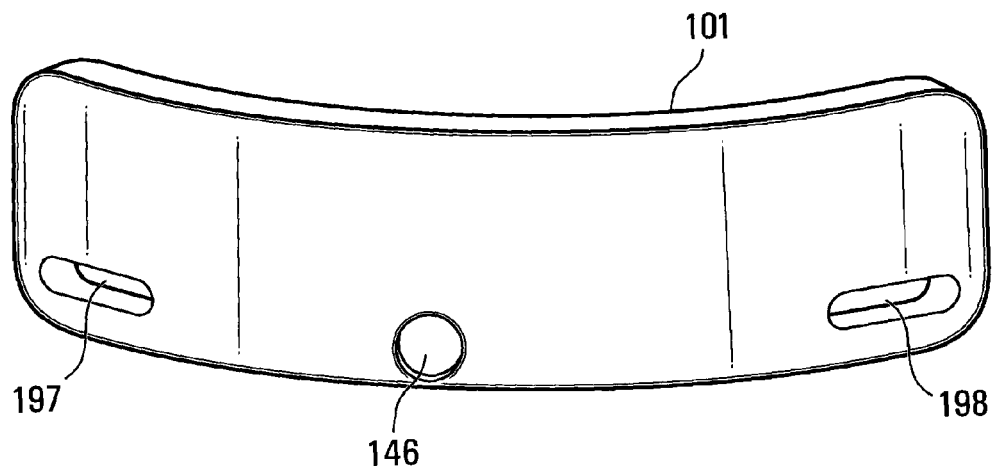
FIG. 16 shows a front perspective view of a data recording unit according to another embodiment of the present invention.
Figure 17:
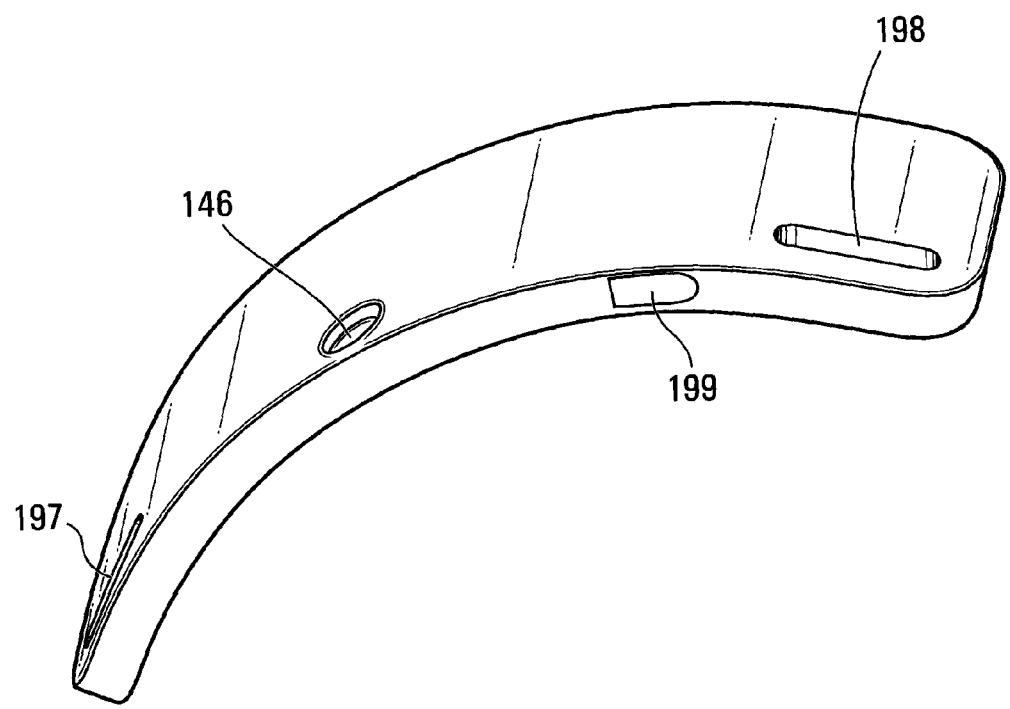
FIG. 17 shows a bottom perspective view of the data recording unit of FIG. 16.

Referring to FIG. 11, some embodiments may be provided with a washer, for example washer plate 186, as part of the mounting structure for mounting the unit to a helmet and which receives the mounting screw or bolt. The washer may provide strain relief and improve retention of the unit to the helmet. In this embodiment, the washer plate is placed over an end portion 188 of the unit and includes a part 190 which overlies a thicker portion 192 of the unit spaced from the end part 188.

In some embodiments, the data recording unit may incorporate one or more additional structural features, such as a bracket for enabling one or more other articles or devices to be carried on the helmet. Conversely, the data recording unit may be incorporated into a mounting structure for mounting other articles or devices to the helmet. An example of a data recording unit having such an additional feature is shown in FIGS. 12 to 15. In this embodiment, the data recording unit includes a bracket 196 for mounting one or more accessories, such as an accessory for a night vision goggle, such as one or more straps and/or one or more battery holders. In fabricating the combined unit, the data recording unit may first be produced without the bracket, using any or more of the steps described above to produce the unit shown in FIG. 13 for example. The mounting bracket 196 may then be added in a further step, which includes securing the bracket to the data recording unit by any suitable means, for example, by adhesion or other mechanical fastening means or by integrating the bracket into the data recording unit using one or more further molding processes.

Figure 18:
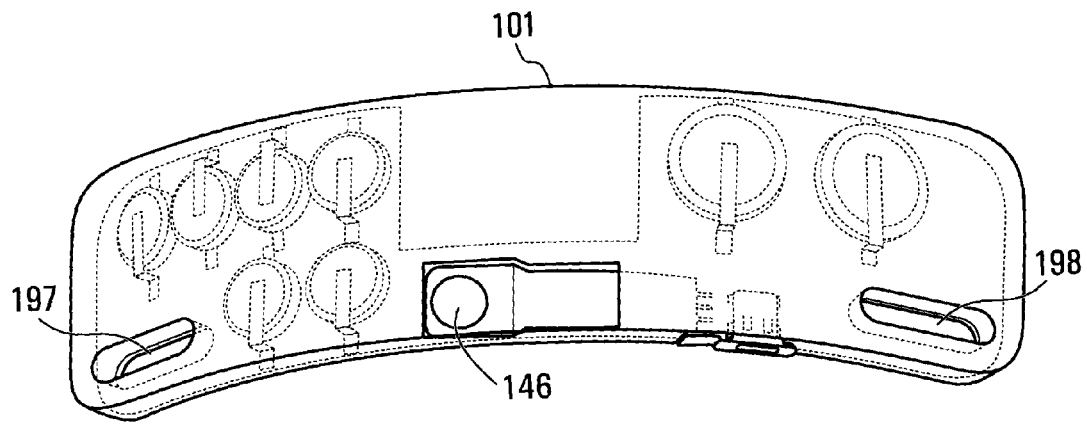
FIG. 18 shows a front perspective view of components of the data recording unit shown in FIGS. 16 and 17.
Figure 19:
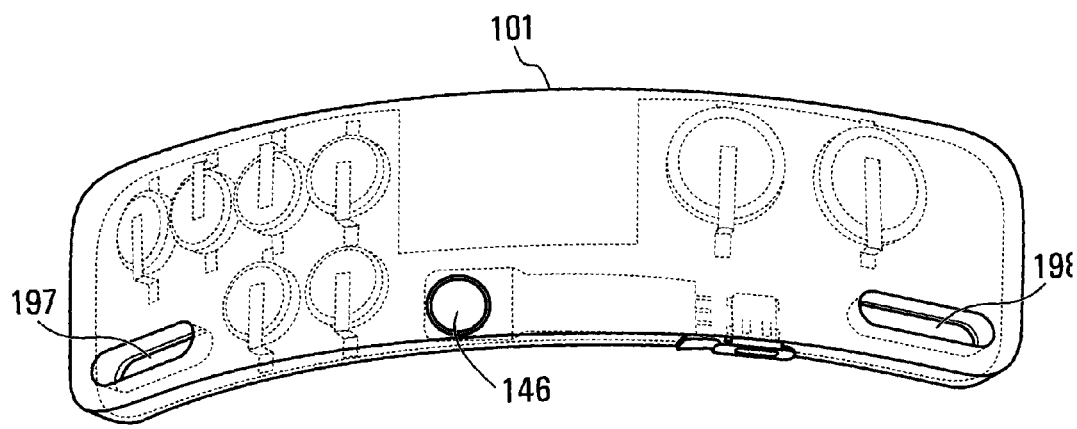
FIG. 19 shows a front and lower perspective view of the data recording unit of FIG. 18 after an additional molding process.
Figure 20:
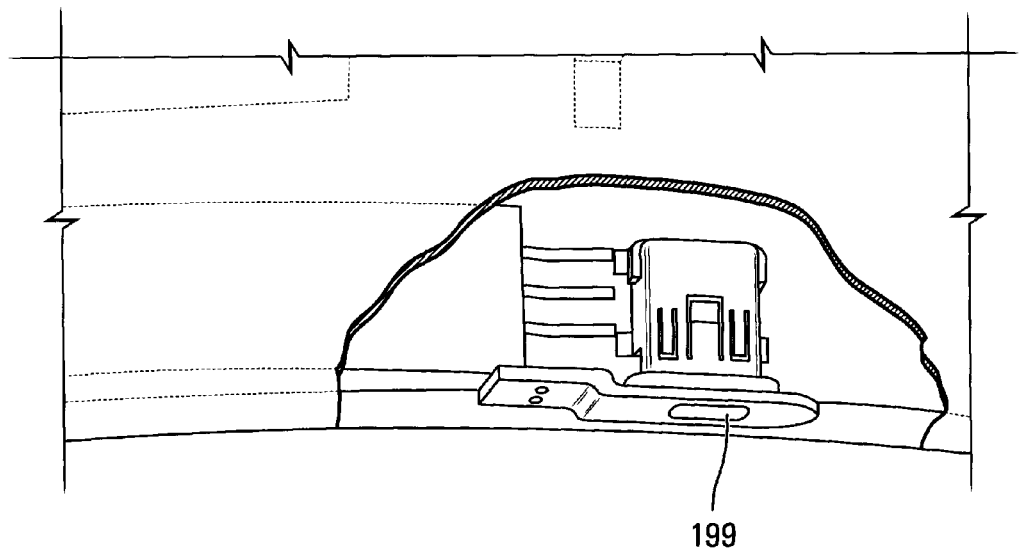
FIG. 20 shows a side view of a USB port molded into a data recording unit according to an embodiment of the present invention.

In some embodiments, the data recording unit may be provided with mounting slots for mounting the unit to a helmet to allow the unit to be mounted to different helmets in which the spacing of existing through holes varies from one helmet to another. An example of an embodiment of such a data recording unit is shown in FIGS. 16 to 21. In this embodiment, the data recording unit comprises a unitary piece 101 having spaced apart first and second slots 197, 198 for receiving screws or bolts for mounting the unit to a helmet. The unit may be fabricated using any one or more of the steps described above and the products resulting from the first and second potting phases are shown in FIGS. 18 and 19, respectively. FIG. 20 shows a more detailed view of a USB connector port having a flexible cover 199. The flexible cover is present during both potting phases and assists in masking the opening of the USB port and defining an aperture for the flexible flap 199 so that at least part of the flap 199 can be seated within the aperture. The flap may be seated to a sufficient depth so as to lie flush with the outer peripheral edge of the data recording unit.

Figure 21:
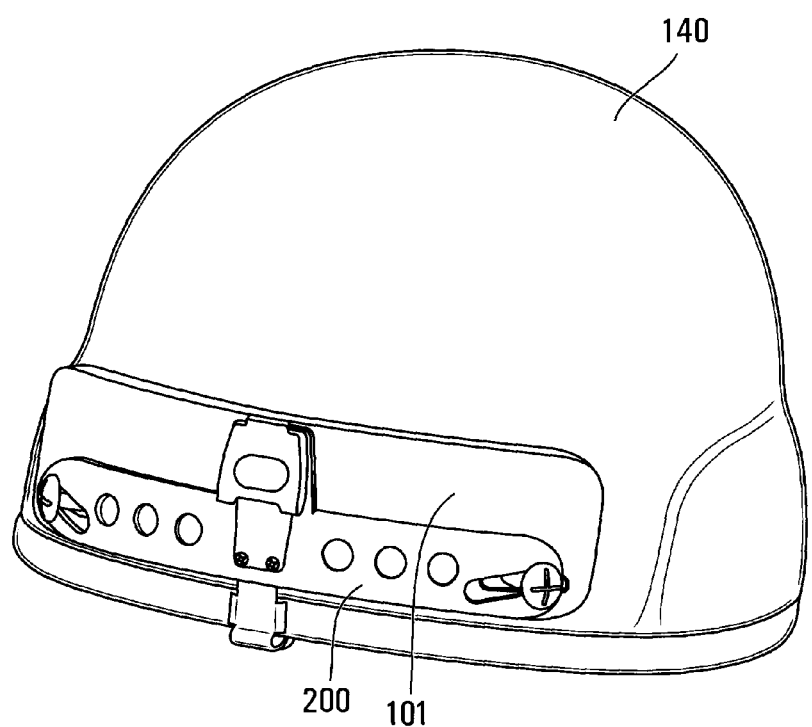
FIG. 21 shows an example of a mounting scheme for mounting the data recording unit to a helmet.
Figure 22:
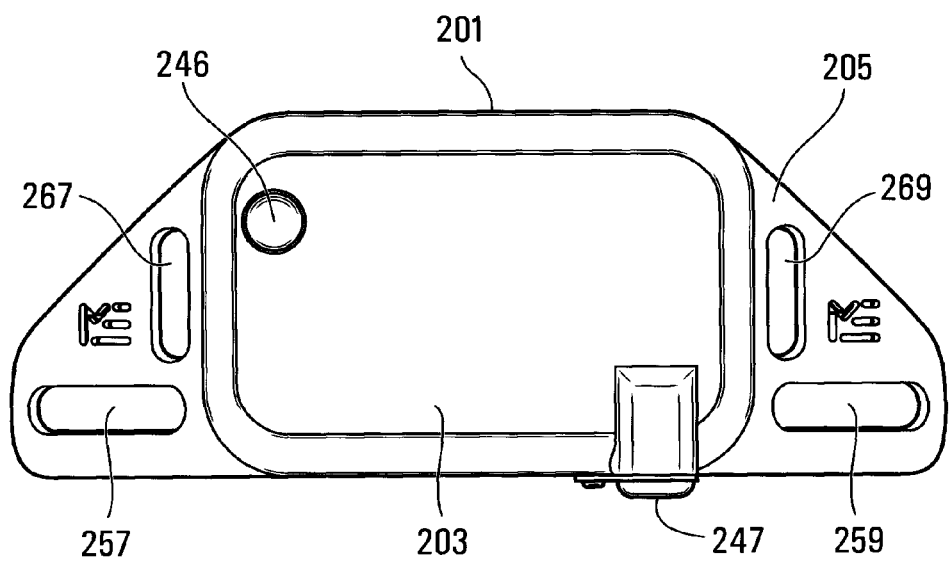
FIG. 22 shows a front view of a data recording unit according to another embodiment of the present invention.

FIG. 21 shows the data recording unit of FIGS. 16 to 20 mounted on a protective helmet together with a night vision goggle bracket 200. In this embodiment, the bracket 200 is a separate piece from the data recording unit and mounted using the same fasteners.

Another embodiment of a data recording unit is shown in FIGS. 22 to 35. Referring to these figures, the data recording unit includes a circuit card assembly 201 and a housing for enclosing the circuit card assembly, which in this embodiment, comprises a housing part 203 and a bracket part 205. The housing and bracket part may comprise a metallic material to isolate internal components of the data recording unit from external electromagnetic signals (e.g. rf) and impulses. The housing and/or bracket may comprise a plastic material, e.g. tough plastics, such as polycarbonate or other non-metallic or polymeric material in the case where shielding is not needed, or the material may be coated with a metallic coating or otherwise include a metallic material, where shielding is required.

The housing and/or bracket may include features that facilitate plastic injection molding.

The housing and/or bracket may include one or more features only possible through plastic injection molding.

Further features may include any one or more of:

Self-locating and complimentary boss feature(s) to simplify the mounting of the circuit card by eliminating the need for fasteners.

Snap-type mating feature(s) between the bracket and housing, eliminating the need for fasteners at that interface.

Integrated ratchet or self tightening system to ensure continuous positive tension on the mounting bracket. i.e. tie-wrap type self-tightening system.

Significantly reduced cost and weight.

In this embodiment, the housing part 203 has a front part 207, opposed side parts 209, 211 and top and bottom parts 213, 215 which define an opening 217 for receiving circuitry of the data recording unit, e.g. the circuit card assembly 201. The bracket part 205 effectively provides a cover or closure for closing the housing and which may thereby form a sealed unit. The housing part 203 includes a number of projections, stand-offs or spacers 219, 221, 223, 225, 227 upstanding from the inner surface of the front part and providing mounting/support points for mounting the circuit card thereto and for providing a space or gap between the circuit card and the front part 217. The front part 203 also includes a number of fastening points 229, 231, 233, 235, 237, 239 positioned at spaced intervals around the peripheral edge of the housing and which, in this embodiment, include holes (for example blind holes) for receiving fastening screws which pass through corresponding through holes in the bracket part 205. The front part may also include a discrete well 241 defined by walls 243 upstanding from the front part for accommodating a communication port/interface such as a USB interface/connector or another interface. The well includes an opening 245 for providing access to the communication port when installed. A plug 247 and washer 248 are provided to seal the communication port opening 245 when required. The washer 248 includes a portion which extends beyond the peripheral edge of the plug 247 and is secured to the housing independently of the plug, for example, by a screw 250 or other means, and the washer thereby provides a tether for holding the plug captive when the plug is released to expose the opening. The housing part 203 further includes an aperture 246 formed in the front part, for example, for exposing the pressure sensor to atmosphere.

Figure 23:
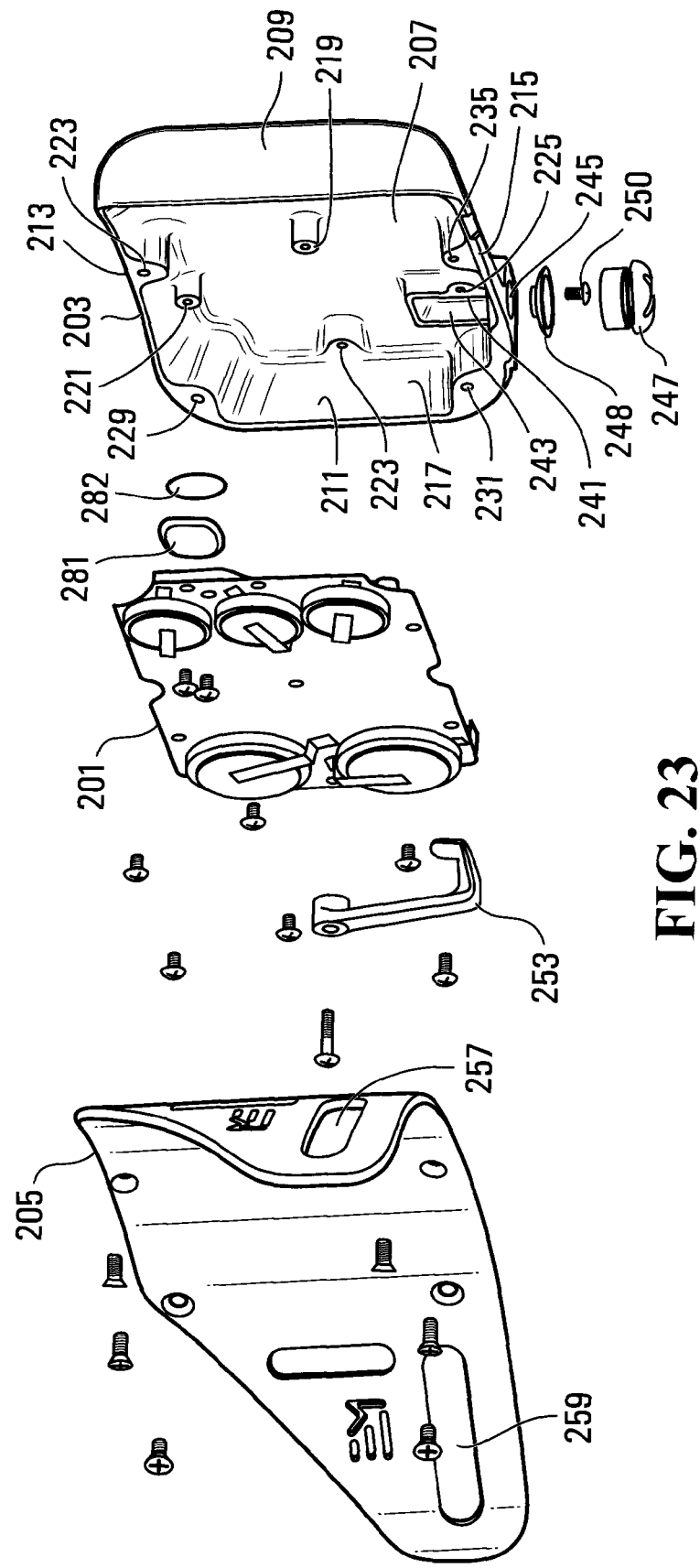
FIG. 23 shows an exploded view of the data recording unit shown in FIG. 22.
Figure 30:
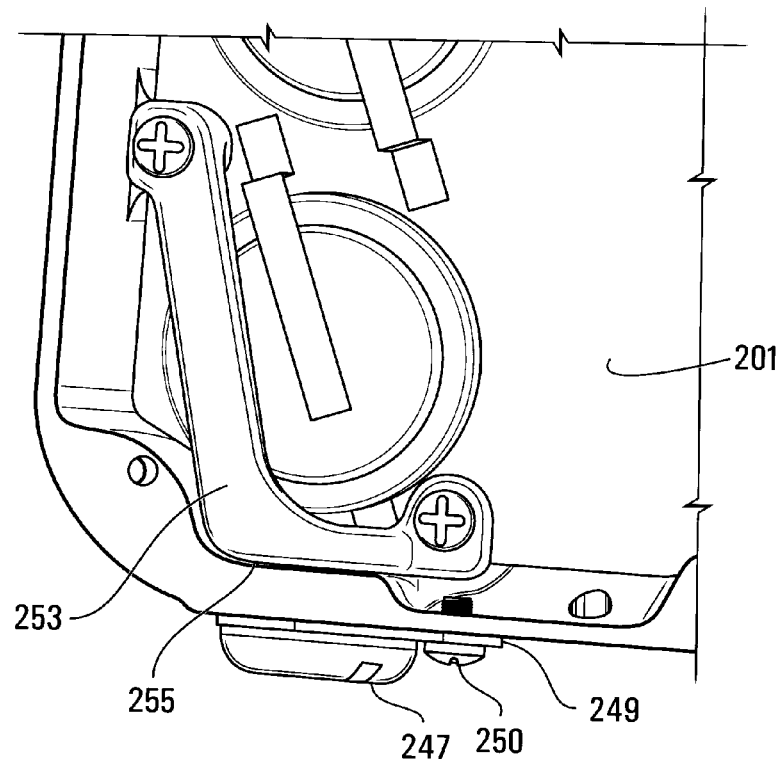
FIG. 30 shows a side view of the USB communications port and its assembly according to an embodiment of the present invention.

Referring to FIGS. 23 and 30, a sealing part 253 may be provided for sealing a gap between the edge of the circuit card and the wall 255 of the housing in order to prevent potting compound from entering the well 241 which accommodates the communication port.

Figure 35:
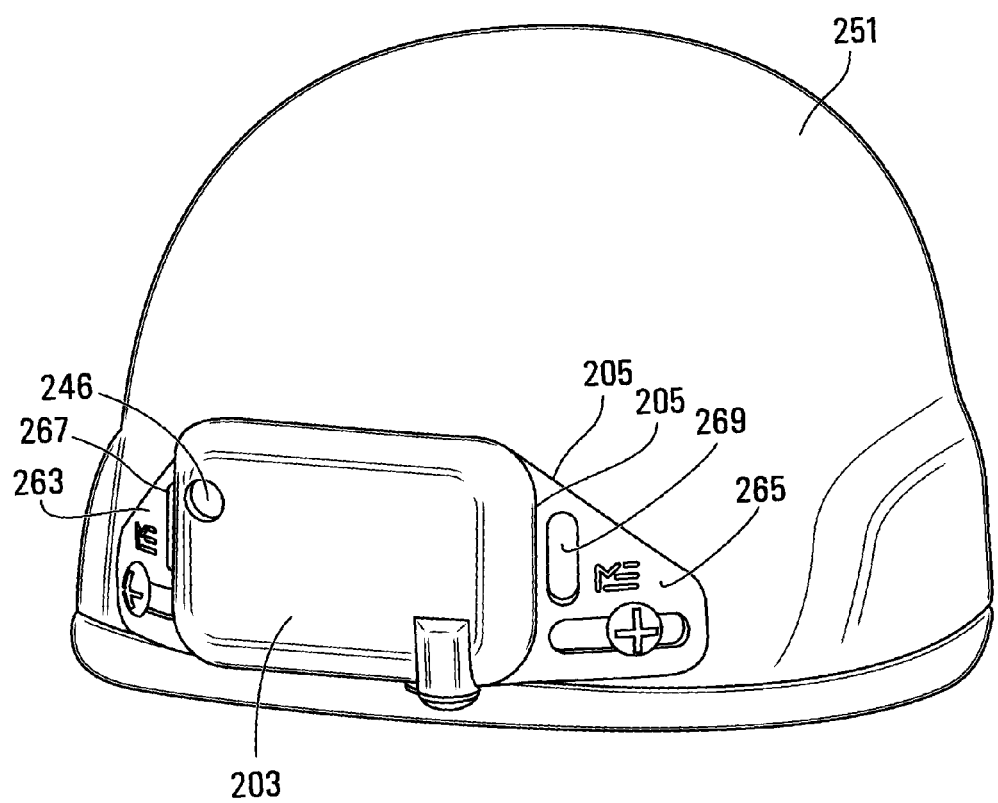
FIG. 35 shows a rear perspective view of a data recording unit mounted to a helmet.

The bracket part 205 includes first and second spaced apart slots 257, 259, which in this embodiment, generally extend horizontally, for receiving a fastening screw or bolt for mounting the data recording unit to a helmet 261, for example, as shown in FIG. 35. The mounting bracket has a curved profile which generally corresponds to the profile of a helmet. Portions 263, 265 of the bracket part 205 which extend beyond the peripheral edge 267 of the housing may be sufficiently flexible to allow them to flex inwardly and/or outwardly to accommodate helmets having different degrees of curvature in the region where the data recording unit is to be mounted. The bracket part may be adapted so that the wing portions 263, 265 flex in preference to portions of the bracket which are inward of the peripheral edge of the housing, to prevent separation of the bracket and housing part along the side wall of the housing. This may be implemented by providing a region of greater flexibility of the bracket beyond the edge of the housing, and in the present embodiment is provided by a slot or aperture 267, 269 formed in a region near the peripheral edge of the housing.

Figure 31:
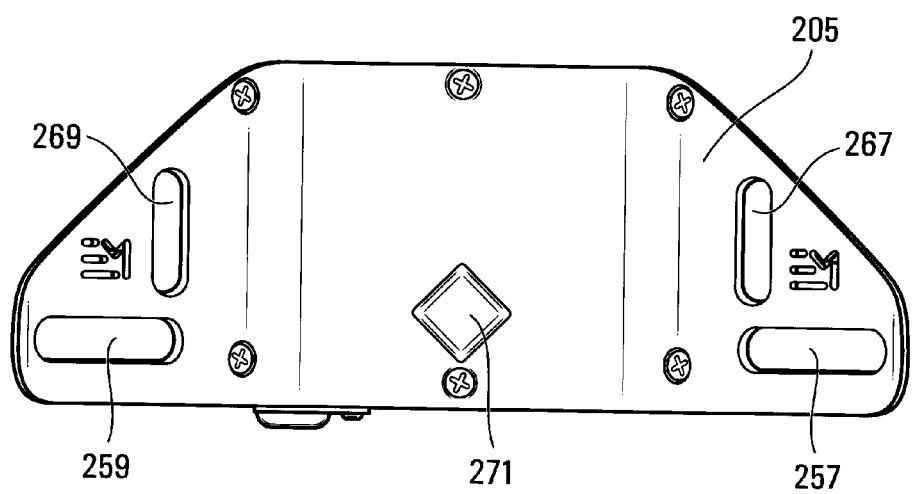
FIG. 31 shows a rear view of a mounting bracket for a data recording unit according to an embodiment of the present invention.
Figures 32, 33:
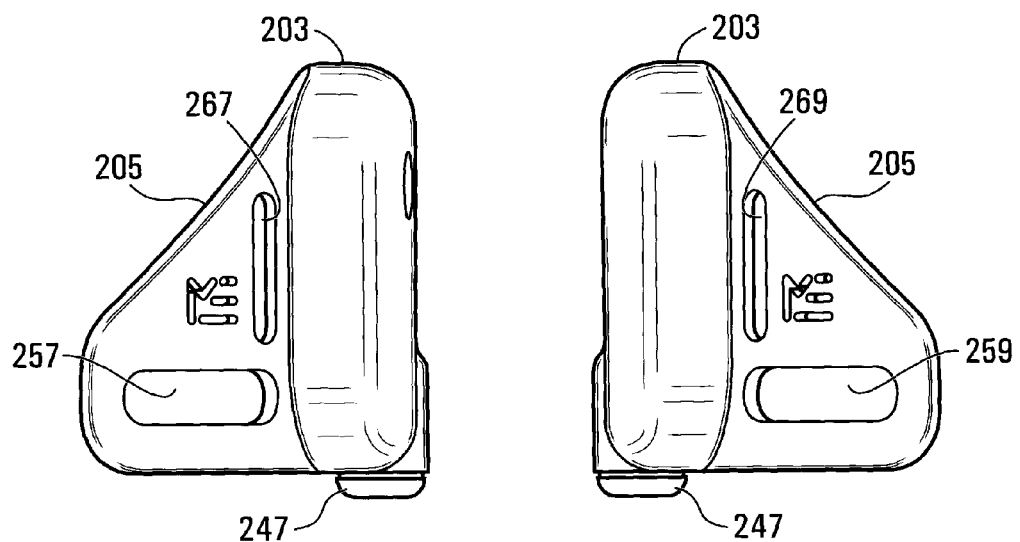
FIGS. 32 and 33 show left and right side views of the data recording unit shown in FIGS. 22 to 31.
Figure 34:
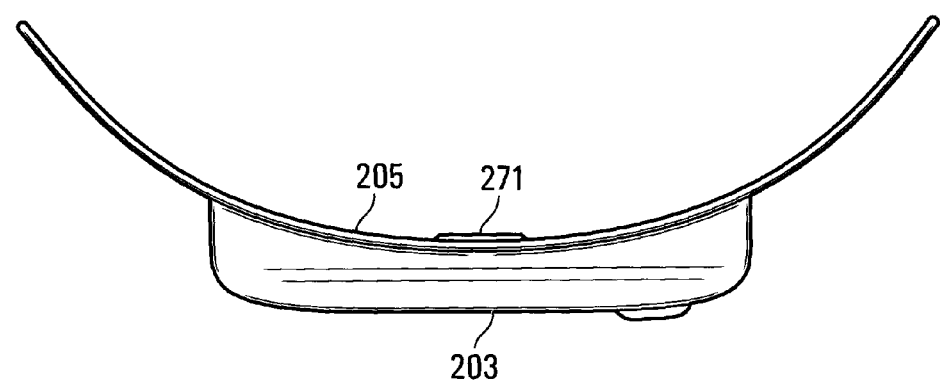
FIG. 34 shows a top or bottom view of the data recording unit shown in FIGS. 22 to 33.

Referring to FIG. 31, a boss or projection 271 extends from the rear face of the bracket part 205 and provides an intimate point of contact between the data recording unit and the helmet shell. The acceleration sensors or at least the acceleration sensor which measures acceleration in the front-back direction may be positioned and securely pressed against the boss to assist in minimizing any relative movement between the helmet and acceleration sensor to improve the accuracy of the measurement.

Figure 27:
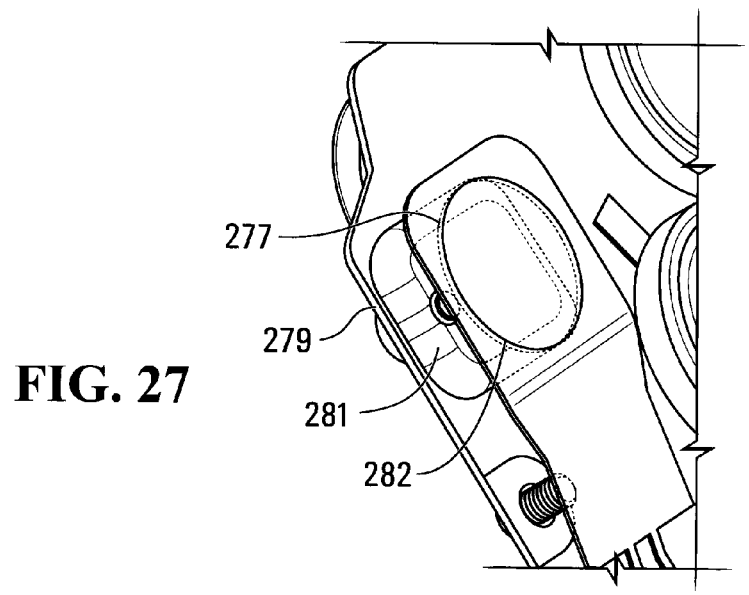
FIG. 27 shows a more detailed view of a pressure sensor incorporated into an embodiment of a data recording unit.
Figure 28:
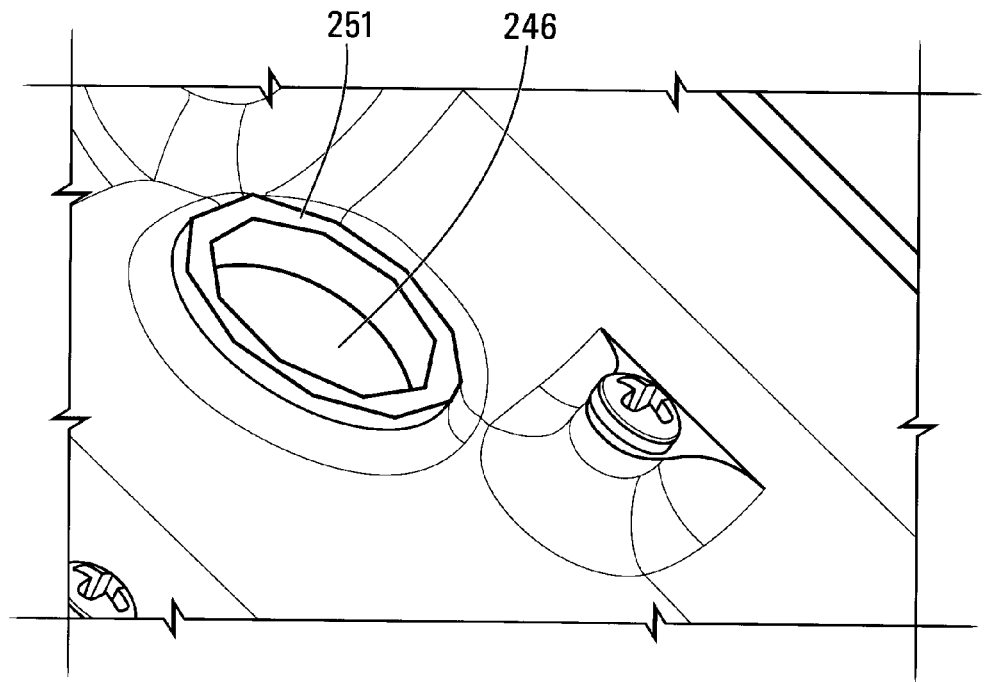
FIG. 28 shows a perspective view of a part of the cover or housing incorporating an aperture for exposing the pressure sensor, according to an embodiment of the invention.
Figure 29:
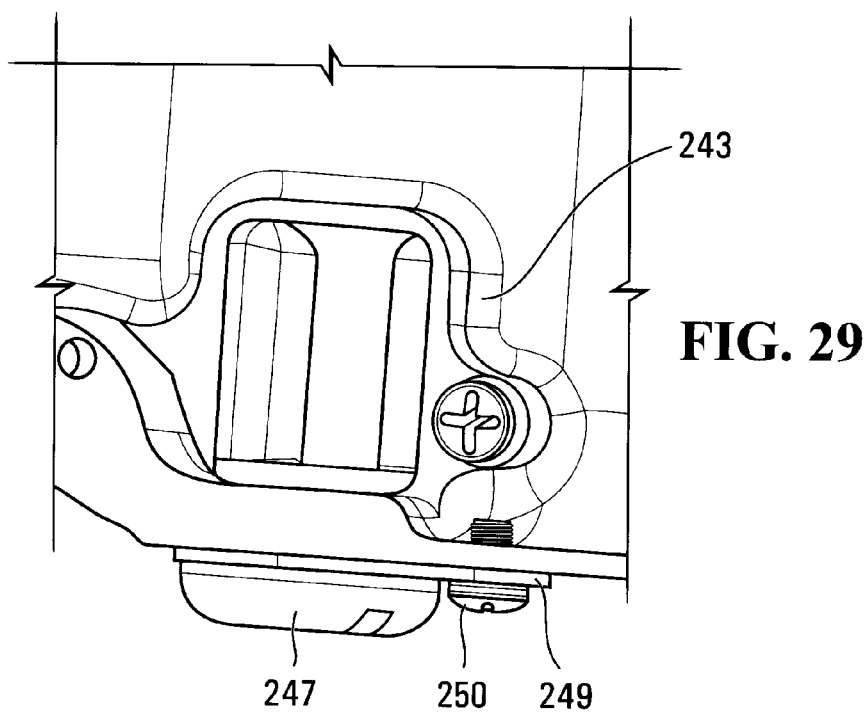
FIG. 29 shows a side view of a USE communications port of the data recording unit shown in FIGS. 22 to 28.

Referring to FIG. 27, the pressure sensor 277 which comprises a sheet-like material is mounted and spaced apart from the substrate 279 of the circuit card assembly by a spacer 281. The spacer may be formed of any suitable material, and in one embodiment, is formed of polycarbonate.

In producing the data recording unit, the circuit card assembly is secured to the housing part 203, for example, by screws 282 (FIG. 26) which are screwed into threaded holes in the mounting projections or bosses upstanding from the front of the housing part. The bosses may be configured to enable the substrate of the circuit card to be held flat within the housing thereby eliminating the stresses which might otherwise occur in embodiments in which the substrate is curved. The spacer 253 is also secured in position and may use the same screws which fasten the circuit card assembly to the housing. With the circuit card assembly fastened to the housing, the pressure sensor abuts the raised peripheral edge 251 of the aperture 246. A sealant may be used to form a seal between the wall 243 of the communication port well and the circuit substrate. The sealant may comprise any suitable sealant, for example, silicon RTV. When installing the sealing spacer 253 and attaching the spacer to the circuit substrate, the sealing spacer may also be sealed with a suitable sealant, for example, silicon RTV, thereby sealing the gap between the edge of the substrate and the wall of the housing part so that the communication port well is sealed to prevent the ingress of potting compound. The communication port/device may also be masked with a suitable masking medium, for example, silicon grease, to ensure that no potting compound can infiltrate the communication port.

Figure 24:
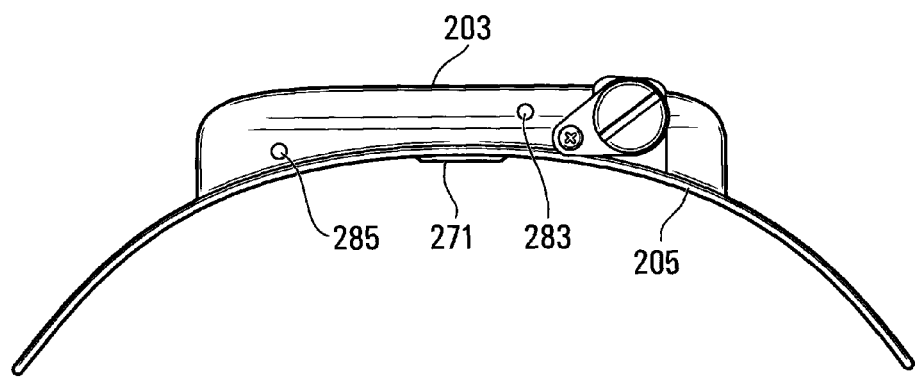
FIG. 24 shows a top or bottom view of the data recording unit of FIGS. 22 and 23.
Figure 25:
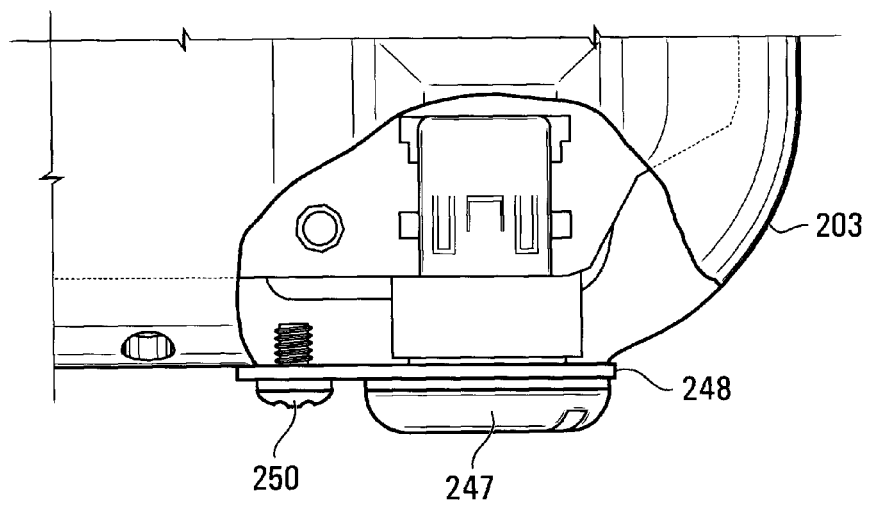
FIG. 25 shows a side view of a USB communications port of the data recording unit shown in FIGS. 22 to 24.
Figure 26:
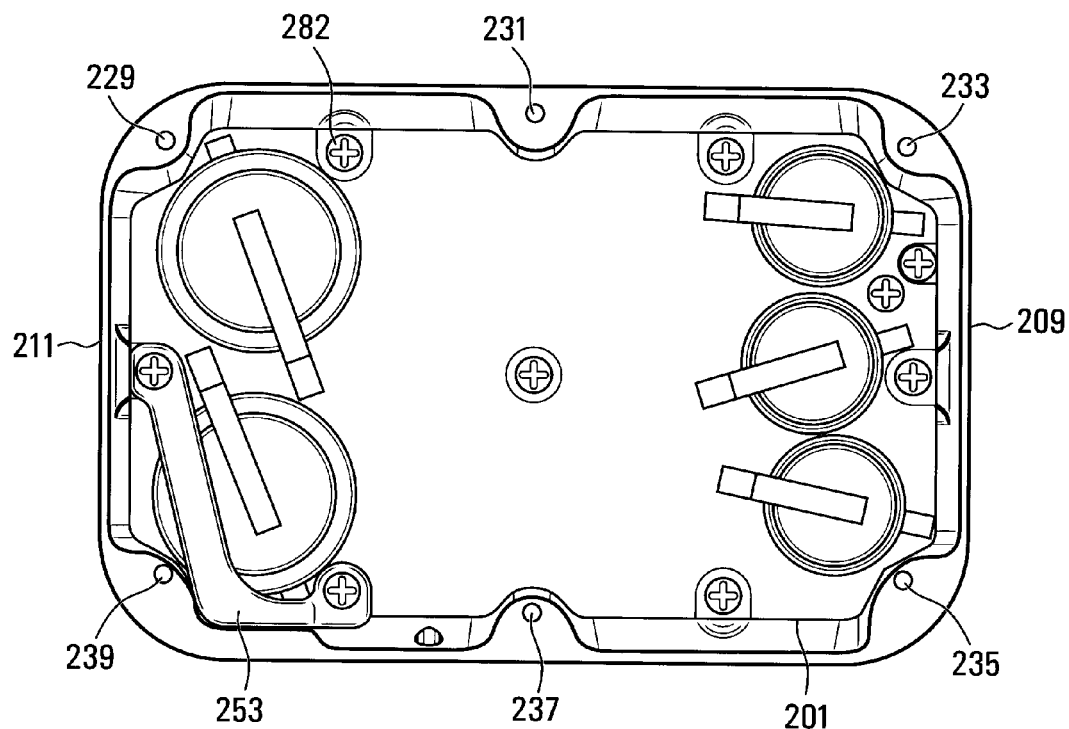
FIG. 26 shows a plan view of a substrate containing components of a data recording unit mounted in a housing.

The bracket part 205 is then attached and secured to the housing part 203 e.g. by means of screws, as for example shown in FIG. 23. The interior of the housing on both sides of the circuit card is then filled with potting compound and allowed to cure or set. For this purpose, an inlet for introducing the potting compound into the housing and a vent for allowing air to escape from the housing are provided and may be positioned at any suitable points. In some embodiments, a port is provided between the front of the housing and the substrate for directly communicating with the space between the front of the housing and one side of the substrate, and another port is provided between the bracket and the opposed surface of the substrate, and which directly communicates with the space between the other side of the substrate and the bracket. An example of two ports in these positions is shown in FIG. 24, in which port 283 is provided on the front facing side of the substrate and port 285 is provided on the rear facing side of the substrate. Either one of the two ports may be used to introduce potting compound into the housing and the other used as a vent. On the other hand, after potting compound has been introduced through one of the ports 283, 285, potting compound may then be introduced through the other port 283, 285 so that their roles are reversed in a second filling phase. This may assist in more completely filling the interior of the housing with potting compound and eliminating air pockets and voids. The potting compound may comprise any suitable potting compound, including an epoxy (e.g. two-part epoxy), urethane and foaming resins, for example, a three-part foaming resin, or other material.

Advantageously, the embodiment of the data recording unit of FIGS. 22 to 35 does not require a separate mold, as the housing and bracket effectively provide the mold for the molding compound and constitutes part of the final structure. The arrangement also can be produced more easily as the circuit card assembly is self locating within the housing, and can be produced more rapidly as the molding can be a single, rather than two or three phase process, requiring time to cure between each step. Advantageously, the metallic housing provides isolation from electromagnetic radiation including EMI and a relatively tough and durable protective shell. The potting compound which intimately surrounds components of the circuit card assembly adds rigidity and strength to the structure so that the components are able to withstand the extremely high accelerations which can accompany an explosive event.

Figure 37:
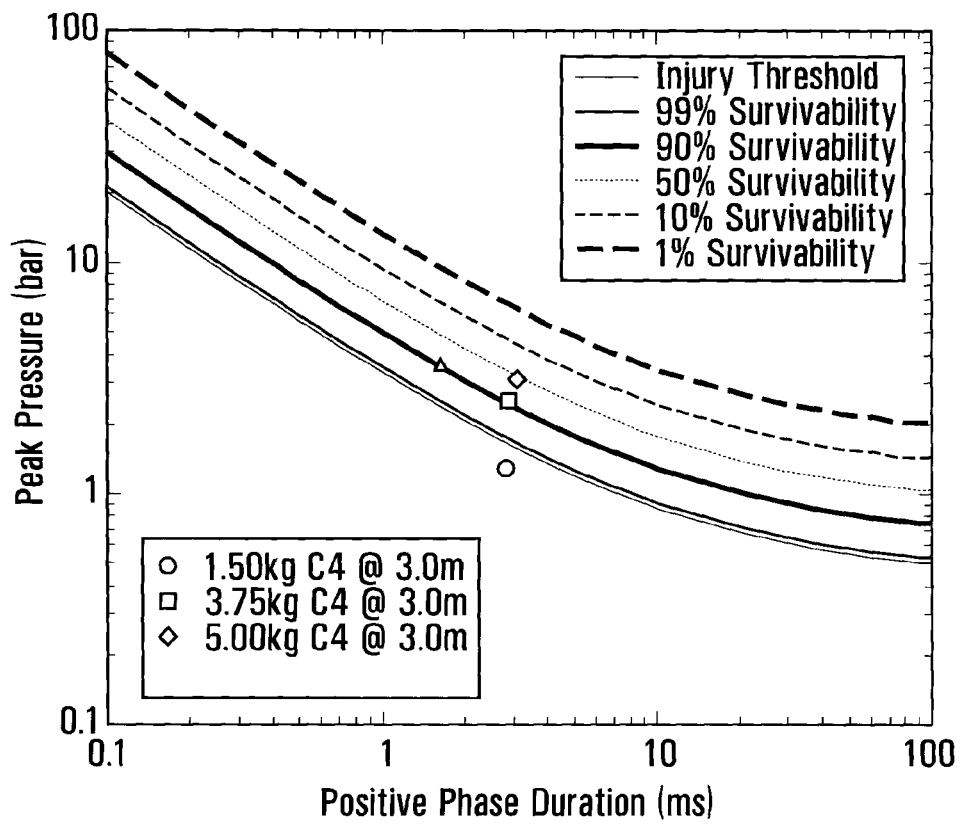
FIG. 37 shows an example of blast injury curves.
Figure 38:
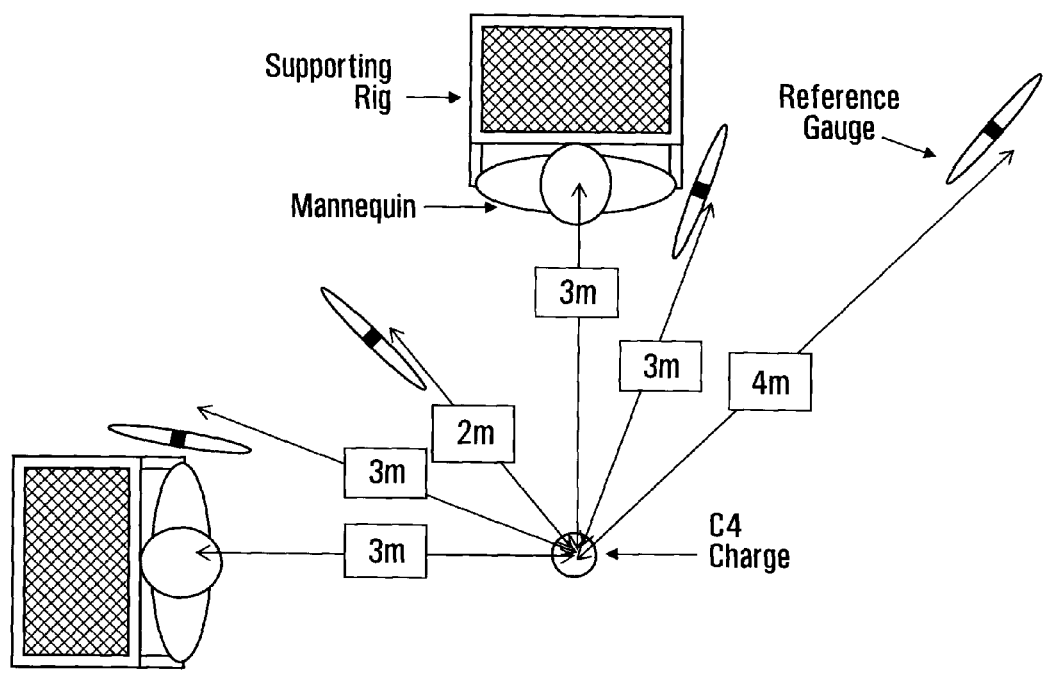
FIG. 38 shows an example of a test arrangement for testing the data recording unit.
Figure 39:
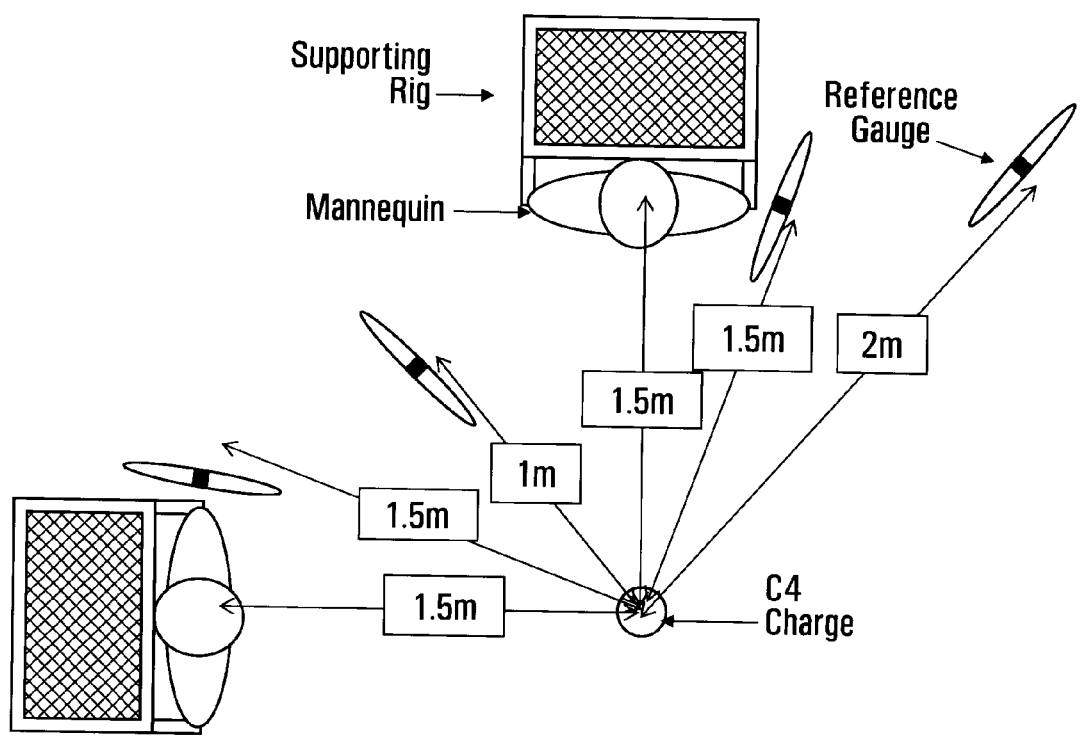
FIG. 39 shows another arrangement for testing a data recording unit.

FIGS. 37 and 38 show examples of arrangements for testing data recording units using two mannequins each having a helmet mounted data recording unit at a predetermined distance from an explosive charge. The reference gauges measure pressure, and four pressure gauges are shown at different positions in each figure.

In other embodiments and aspects of the invention, any feature disclosed herein may be omitted altogether or substituted by another feature which may or may not be an equivalent or variant thereof.

Embodiments of the data recorder may be mounted on any object. For example, it may be mounted on a vehicle or a stationary object, or on any article of apparel to be worn by a person.

Embodiments of the data recorder may be capable of measuring accelerations having values of at least 1,500 gs, for example, 5,000, 10,000 or 15,000 gs or more.

Other aspects and embodiments of the invention comprise any feature disclosed herein in combination with any one or more other feature disclosed herein or a generic or specific equivalent or variant thereof.

Any embodiment may comprise sensor means for measuring rotational motion, for example, rotational acceleration. The sensor means may comprise a plurality of spaced apart sensors (e.g. accelerometers) located at different positions either within a data recording unit, or one or more sensors may be separate from the unit and mounted on the object to be monitored, for example, on a head protector.

The data recording unit may record data from the rotational sensor(s).

In other embodiments, any other sensor or sensing means may be used to detect an explosive source, or any parameter indicative of an explosive source. For example, a sensor adapted to sense light level, change of light level, airborne chemical constituents or other atmospheric constituents, radiation or a visual and/or audio recording of the event or any other parameter which enables an explosive force to be discriminated from that of another source.

Numerous modifications to the embodiments described above will be apparent to those skilled in the art.

The invention claimed is:

1. An apparatus for recording information about a plurality of events resulting in application of force to a body, comprising data recording means for recording said information, sensor means for sensing a parameter which enables a predetermined source of force to be distinguished from another, different source of force, and control means responsive to the sensed parameter for controlling said data recording means, and further comprising means for indicating a chronological order of said plurality of events and a generator for generating said means for indicating, wherein said generator is operatively coupled to receive a timing signal from generating means that generates a timing signal for operation of the data recording means.

2. An apparatus as claimed in claim 1, adapted to be mounted on a head protector.

3. An apparatus as claimed in claim 2, wherein said sensor comprises a pressure sensor, said pressure sensor adapted to discriminate between pressure and acceleration.

4. An apparatus as claimed in claim 2, wherein said pressure sensor comprises a layer of material, at least one property of which changes with pressure.

5. An apparatus as claimed in claim 3, wherein the inertia of said pressure sensor is insufficient to generate a significant signal responsive to acceleration for an acceleration of at least 450 gs.

6. An apparatus as claimed in claim 5, wherein said control means is adapted to control the recording of data such that recorded data resulting from said predetermined source can be distinguished from recorded data resulting from another source of force.

7. An apparatus as claimed in claim 6, wherein said data recording means comprises a memory space reserved only for recording data from said predetermined source, and said data recording means is responsive to said controller to record only data from said predetermined source in said reserved memory space.

8. An apparatus as claimed in claim 7, further comprising means for providing an indicator for indicating that data results from said predetermined source of force.

9. An apparatus as claimed in claim 8, wherein said data recording means is adapted to store said indicator with said data.

10. An apparatus as claimed in claim 9, wherein said data recording means is adapted to be capable of recording data resulting from said predetermined source of force in the same memory space as other data resulting from another, different source of force has previously been recorded, thereby overwriting said other data.

11. An apparatus as claimed in claim 10, wherein said data recording means is adapted to enable said other data to be overwritten if a predetermined criteria is met.

12. An apparatus as claimed in claim 11, wherein said predetermined criteria is that there is no more unused space for recording data from said predetermined source of force.

13. An apparatus as claimed in claim 12, wherein said control means is adapted to switch said data recording means between an active state and an inactive state based on the sensed parameter, wherein, in the inactive state, the data recording means is unable to record data, and in the active state, the data recording means is able to record data, and wherein in the active state, said data recording means draws more electrical power than when in the inactive state.

14. An apparatus as claimed in claim 1, further comprising monitoring means for monitoring a power source for providing power to said apparatus, wherein said monitoring means is responsive to activation of said data recording means to record a monitored parameter of said power source.

15. An apparatus as in claim 1, wherein said data recording means is capable of recording data from a plurality of events that occur within 1 second.

16. An apparatus as claimed in claim 1, wherein said generating means is adapted to be activated in response to said timing signal from said generator that generates a timing signal for operation of said data recording means.

17. An apparatus as claimed in claim 1, wherein said means for indicating comprises a time stamp.

18. An apparatus for recording information about a plurality of events resulting in application of a pressure or acceleration to a body, comprising data recording means for recording said information, sensor means for sensing a parameter which enables a predetermined source of pressure or acceleration to be distinguished from another, different source of pressure or acceleration, and control means responsive to the sensed parameter for controlling said data recording means, and further comprising means for indicating a chronological order of said plurality of events and a generator for generating said means for indicating, wherein said generator is operatively coupled to receive a timing signal from generating means that generates a timing signal for operation of the data recording means.

* * * * *